United States Patent
Weitz et al.

(10) Patent No.: US 6,771,630 B1
(45) Date of Patent: Aug. 3, 2004

(54) MULTI CHANNEL CONTROLLER

(75) Inventors: Eliezer Weitz, Hulon (IL); Yoram Yeivin, Hod-Hasharon (IL); Yossi Socoletzki, Hadera (IL); Adi Katz, Holon (IL); Moti Kurnick, Tel-Aviv (IL); Avi Shalev, Tel-Aviv (IL); Avi Hagai, Herzelia (IL)

(73) Assignee: Freescale, Semiconductor, Inc., Austin, TX (US)

( * ) Notice: Subject to any disclaimer, the term of this patent is extended or adjusted under 35 U.S.C. 154(b) by 0 days.

(21) Appl. No.: 09/498,075

(22) Filed: Feb. 4, 2000

(30) Foreign Application Priority Data

Feb. 6, 1999 (EP) ............................................. 99102338

(51) Int. Cl.$^7$ ................................................ H04Q 7/28
(52) U.S. Cl. ................................................ 370/340
(58) Field of Search ................................ 370/340, 236, 370/522–525, 471–479, 441, 459, 378, 264, 421, 465; 710/11, 62, 52, 305, 36; 711/113; 713/400; 375/145

(56) References Cited

U.S. PATENT DOCUMENTS

| | | | | |
|---|---|---|---|---|
| 4,701,845 A | | 10/1987 | Andreasen et al. ......... 364/200 |
| 4,730,308 A | | 3/1988 | Friedman et al. ............. 370/85 |
| 5,317,713 A | * | 5/1994 | Glassburn ................... 711/113 |
| 5,388,217 A | * | 2/1995 | Benzschawel et al. ........ 710/36 |
| 5,600,814 A | | 2/1997 | Gahan et al. ................ 395/427 |
| 5,682,605 A | * | 10/1997 | Salter ......................... 375/145 |
| 5,721,726 A | * | 2/1998 | Kurnick et al. ............. 370/236 |

FOREIGN PATENT DOCUMENTS

| EP | 0 178 137 A1 | 10/1985 | ........... H04Q/11/04 |
|---|---|---|---|
| EP | 0 459 758 A2 | 5/1991 | ........... H04L/29/06 |
| EP | 0 821 509 A2 | 1/1998 | ........... H04L/29/06 |

OTHER PUBLICATIONS

"Eight– to Sixteen–Bit Universal Synchronous/Asynchronous Receiver and Transmitter Conversion"; IBM Technical Disclosure Bulletin; vol. 31; No. 9; Feb. 1989; pp. 128–129; XP000023456; Armonk, New York, USA.

"Univeral HDLC controller keeps high–speed data in sync" by Hans–Georg Huber; Siemens Components; vol. 27; No. 1; Jan. 1992; pp. 22–24; XP000306055; Siemens Aktiengesellschaft Munich, Germany.

MC68360UM/AD; Rev. 1; Quad Integrated Communications Controller; User's Manual by Motorola.

* cited by examiner

*Primary Examiner*—Chi Pham
*Assistant Examiner*—Prenell Jones

(57) ABSTRACT

A communication controller (111) for handling and processing data packets received from a large number of communication channels (181–188). The communication controller (111) comprising of: a processor (160) for processing data; a serial interface (28), coupled to the communication channels (181–188). A multi channel controller (100, 100') coupled to the serial interface (28) and the processor (160), for interfacing between the communication channels (181–188) and the processor (160). The communication channels (181–188) and the serial interface (28) send and receive data packets. The processor (160) sends, receives and processes data words. The multi channel controller (100) receives data packets from the serial interface (28), concatenates data packets and sends data words to the processor (160). The multi channel controller (100) receives data words from the processor (160), and transmits data packets to the serial interface (28).

28 Claims, 14 Drawing Sheets

MULTI CHANNEL CONTROLLER

FIELD OF THE INVENTION

The invention concerns a multi-channel controller.

BACKGROUND OF THE INVENTION

Communication controllers need to handle a large number of communication channels. In each of the communication channels, data is sent in packets of variable size. The packets include transmit packets and receive packets. Transmit packets are packets of data which are sent from the communication controller to the communication channels and receive packets are packets of data which are sent from the communication channels to the communication controller. A receive packet is usually buffered within a memory storage element of the communication controller and then is sent to the communication controller central processing unit (i.e.—CPU), in order to be processed. A transmit packet is usually buffered within memory bank of the communication controller before being sent to a communication channel. In prior art arrangement each received packet was sent to the CPU, and the CPU handled one packet at a time. The CPU also handled a single transmit packet at a time.

In many cases the packet length (e.g.—the number of bits of the packet) PL was much smaller than the CPU's size (e.g.—the number of data bits a CPU can read in a single clock cycle) CS. When a CPU handles just a single packet at a time, it reduces the CPU performances. For example, a packet length could be 2, 4 or 8 bits while the CPU's size is 16, 24, 32 or 64 bit. If a 32-bit CPU handles just 2 bits at a time, the remaining 30-bits of the CPU are not utilized.

Furthermore, a CPU usually handles a packet as a result of an interrupt. A communication controller can handle a limited number of interrupt requests. Handling a single packet in a interrupt request, limits the number of packets the communication controller can handle.

When an interrupt is sent to the CPU, it is usually accompanied by various data and status fields. When dealing with multiple communication channels, the CPU has to be fed with a label which indicates what is the relevant communication channel. When receiving data from a communication channel, the CPU also need to read the received data. Usually, the status and data are stored in queues. If the receive queue (which stores both status and data) is the same as the transmit queue (which stores status), a significant part of the transmit queue is wasted. There is a need to design a efficient queues, which can store status bits (transmit queue) and store both status and data (receive queue) in a efficient way.

When an interface, such as but not limited to a communication controller, receives (transmits) PL-bit data packets, and transmits (receives) CS-bit data to a receiver, such as but not limited to a processor, there is a need to detect when CS bits were received from a communication channel. When the interface is coupled to multiple communication channels it is very difficult to count the bits of each channel, and alternatively, having a dedicated counter which counts the number of bits received from each communication channel is very die consuming. There is a need of an efficient interface which can receive (transmit) PL-bit data packets from (to) multiple communication channels and transmit (receive) CS-data bit words to a receiver, such as but not limited to a processor.

There is a need of a communication controller which handles in an efficient manner a plurality of data packets which are sent from multiple communication channels.

SUMMARY OF THE INVENTION

The problem underlying the invention is basically solved by applying the features laid down in the independent claims. Preferred embodiments are given in the dependent claims.

An advantage of the present invention is that it provides a communication controller and an interface which handle a plurality of packets simultaneously.

DETAILED DESCRIPTION OF THE DRAWINGS

Figure 1:
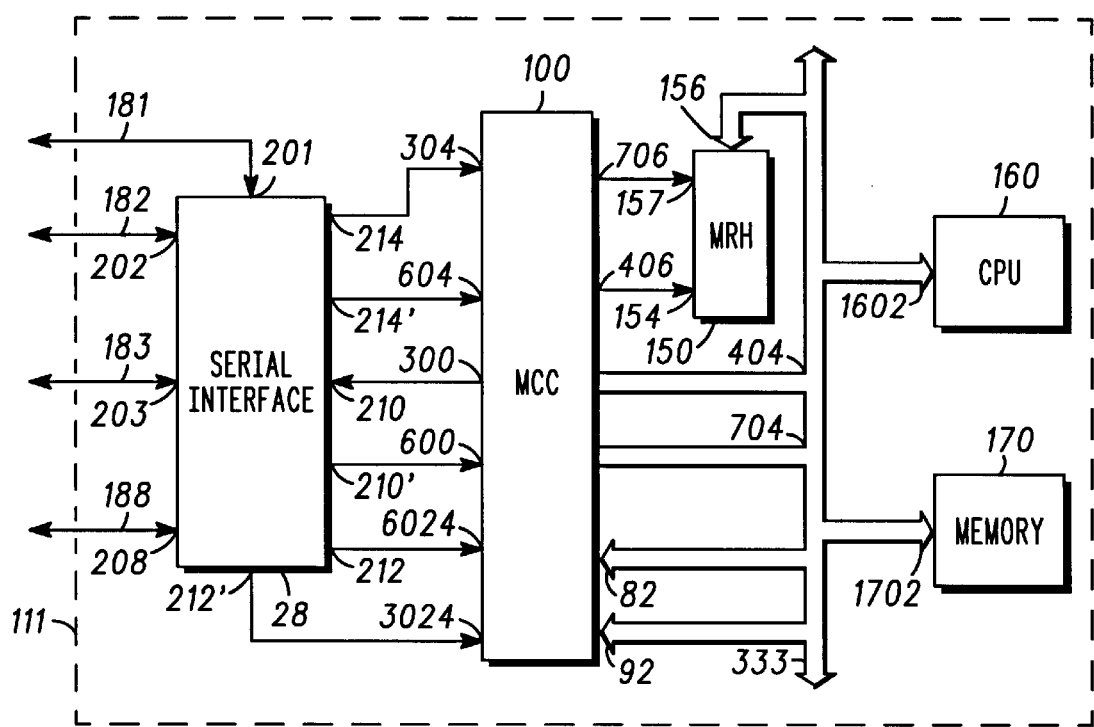
FIG. 1 is a simplified schematic diagram of a communication controller, according to a preferred embodiment of the invention.

FIG. 1 is a simplified schematic diagram of a communication controller 111, according to a preferred embodiment of the invention. Communication controller 111 is coupled to a plurality of physical layer serial lines (i.e.—communication channels) 181–188. Communication controller 111 comprises of serial interface (i.e.—SI) 28, multi channel controller (i.e.—MCC) 100, MCC request handler (i.e.—MRH) 150, CPU 160, CPU bus (i.e.—bus) 333 and memory 170. Communication controller (111) can also be implemented by an interface (222), which interfaces between a receiver (224) and multiple communication channels (181–188). The receiver (224) is preferably a processor (160). For convenience of explanation, the receiver (224) is referred to as processor (160) and the interface is referred to a communication controller (111).

SI 28 has inputs/outputs (i.e.—I/O's) 201–208, input 210 and outputs 210', 212,212', 214 and 214". MCC 100 has inputs 304, 604, 600, 6024, 3024, 82 and 92, and outputs 300, 404, 704, 406 and 706. MRH 150 has inputs 154 and 157 and I/O 156. Memory 170 has I/O 1702. CPU 160 has I/O 1602. I/O 1602 of CPU 160, I/O 1702 of memory 170, I/O 156 of MRH 150, outputs 404, 704, 82 and 92 of MCC 100 are coupled to bus 333. Inputs 201–208 of SI 28 are coupled to communication channels 181–188, respectively. Input 210 of SI 28 is coupled to output 300 of MCC 100. Outputs 210', 212, 212', 214 and 214' of SI 28 are coupled to inputs 600, 6024, 3024, 604 and 304 of MCC 100, respectively. Outputs 406 and 706 of MCC 100 are coupled to inputs 157 and 154 of MRH 150, respectively.

SI 28 couples M communication channels 181–188 to MCC 100. SI 28 allows to divide a group of communication channels into channels separated by time, using Time Division Multiplexing technique. For convenience of explanation, a single communication channel of which a group of communication channels is multiplexed to, is referred to as a TDM channel.

SI 28 conveniently has a TDM receive channel and a TDM transmit channel. Preferably, SI 28 has four TDM receive channels and four TDM transmit channels, but can also have other amounts of TDM channels. The coordination of SI 28 having multiple TDM channels and MCC 100 is described in reference to FIGS. 15–17. SI 28 can be equivalent to the serial interface of Motorola's MC68360 chip, but other serial interfaces can be used.

SI 28 conveniently determines which communication channel will receive or transmit data packets, and also sends enable control signals to start and stop the transmission (reception) of data from (to) MCC 100. This Determination can also be made by MCC 100, CPU 160 or other elements which are not shown in FIG. 1.

CPU 160 processes data words according to a variety of communication protocols. One of the communication protocols can be a HDLC protocol. The data words can be sent to (from) CPU 160 from (to) MCC 100, memory 170 or from peripherals (not shown in FIG. 1).

MCC 100 receives data packets from SI 28, concatenates consecutive CS-bit data packets of the j'th communication channel and sends MRH 150 DW-bit data words. Usually the data word is accompanied by status information such as j 333. DW being an integer, j 333 being a label having values from 1 to M. Conveniently DW<CS. MRH 150 sends the data word and the status information to CPU 160. MCC 100 also receives data words from CPU 160, divides them into data packets and sends SI 28 the data packets, which eventually are send from SI 28 to communication channels 181–188. Usually the data words sent from CPU 160 are accompanied by status information such as j 333. MCC 100 notifies MRH 150 that it is ready to receive or transmit data words to or from CPU 160. MRH 150 is conveniently an interrupt controller, which generates an interrupt request to CPU 160, when it is notified by MCC 100.

For example, and without limiting the scope of the invention, SI 28 is coupled to 256 communication channels. The size of a data packet is 8 bits. SI has a single TDM channel and CPU 160 size is 32 bit. MCC concatenates two or four data packets of the same channel (out of 256 channels) and notifies MRH 150 that it is ready to send a data word to CPU 160. MRH 150 generates a interrupt request, which causes CPU 160 to receive a data word of 16 bits.

Conveniently, label j (i.e.—j) 333 is attached to each data packet and to each data word. J 333 indicated from (to) which communication channel a data word or a data packet is or received (transmitted). For example, if a data packet was sent from the third communication channel, j 333 equals three. J 333 will be attached to the data packets sent from/to the third communication channel to/from SI 28. J 333 will also be attached to a data word which is concatenated by MCC 100 and sent to CPU 160, and will also be attached to a data word which is sent from CPU 160 to MCC 100 and accordingly to the third communication channel. As explained in accordance to the following figures, j 333 does not have to be attached to each data word and data packet, and can also be used as a control signal which determines, where to store data packets or data words concerning the j'th communication channel.

The coordination of CPU 160, MRH 150, SI 28, MCC 100, bus 333 and communication channels 181–188 is more fully explained in connection to the forthcoming figures.

Figure 2:
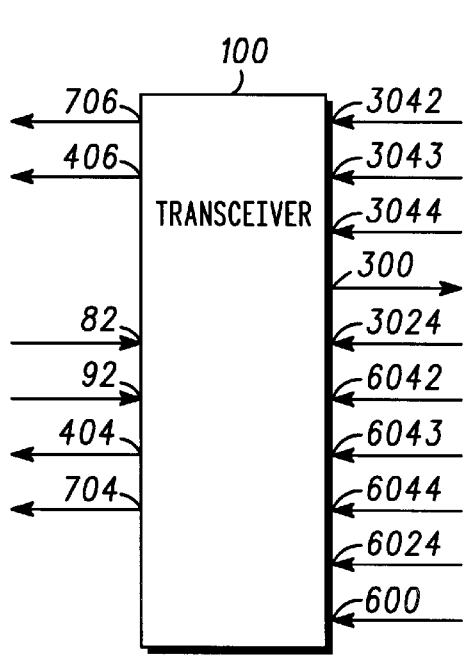
FIG. 2 is a simplified schematic diagram of the signals which are received and transmitted from the multi channel controller, according to a preferred embodiment of the invention.

FIG. 2 is a simplified schematic diagram of the signals which are received and transmitted from MCC 100, according to a preferred embodiment of the invention. MCC 100 has three groups of inputs and outputs: a receive group, transmit group and a CPU group. The receive group is activated when MCC 100 receives data packets from SI 28. The transmit group is activated when MCC 100 transmits data packets to SI 28. The CPU group is activated when MCC 100 exchanges data words with CPU 160 or with MRH 150.

The receive group comprises of: input 6042, for receiving j 333 from SI 28. Input 6043, for receiving TXSTART signal 6043' that indicates that a first bit of a data packet, is sent to MCC 100. Input 6044, for receiving TXEND signal 6044' that indicates that a last bit of a data packet is sent to MCC 100 and Input bus 6002, for receiving data packets from SI 28. Receive group can also have input 6024 for receiving clock signals from SI 28. Inputs 6042, 6043 and 6044 are collectively denoted as 604.

The transmit group comprises of: input 3042, for receiving j 333 from SI 28. Input 3043, for receiving RXSTART signal 3043' that indicates that a first bit of a data packet is to be received by SI 28. Input 3044, for receiving RXEND signal 3044' that indicates that a last bit of a data packet is to be received by SI 28, and Output bus 3002, for transmitting data packets to SI 28. Transmit group can also have input 3024 for receiving clock signals from SI 28. Inputs 3042, 3043 and 3044 are collectively denoted 304.

The CPU group comprises of: Output 406, for sending signal 4062' which indicates that MCC 100 is ready to send a data word to CPU 160. Output 706, for sending signal 7062' which indicates that MCC 100 is ready to receive a data word from CPU 160. Output 404 for sending status signals comprising j 333 to CPU 160. Output 704 for sending a data word and status signals comprising j 333 to CPU 160. Inputs 82 and 92 for receiving status signals comprising J 333, data word, initialization words and reset words from CPU 160.

Figure 3:
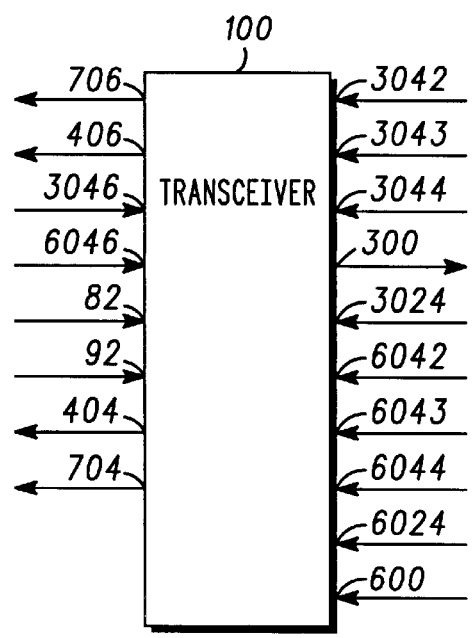
FIG. 3 is a simplified schematic diagram of the signals which are received and transmitted from the multi channel controller, according to another preferred embodiment of the invention.

FIG. 3 is a simplified schematic diagram of the signals which are received and transmitted from MCC 100', according to another preferred embodiment of the invention. MCC 100' of FIG. 3 is analogues to MCC 100 of FIG. 3, but has additional inputs 3046 and 6046 for receiving additional status signals 3046' and 6046' accordingly, from SI 28. Status signals 6046' and 3046' can be used to control the size of data words to be sent (received) from (to) CPU 160. Status signals 3046' and 6046' can be sent to CPU 160 via outputs 404 or 704 accordingly.

Figure 4:
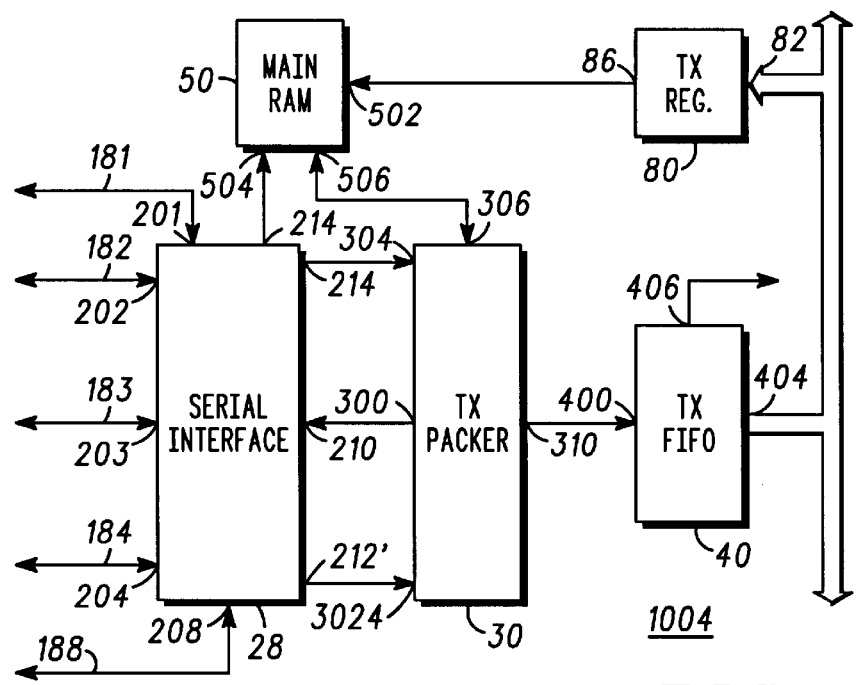
FIG. 4 is a simplified schematic diagram of a transmission portion of the multi channel controller, according to a preferred embodiment of the invention.

FIG. 4 is a simplified schematic diagram of a transmission portion 1004 of MCC 100 according to a preferred embodiment of the invention. Portion 1004 comprises of SI 28, transmit packer (i.e.—TX PACKER) 30, transmit stack (i.e.—TX FIFO) 40, memory bank (i.e.—MAIN RAM) 50 and transmit register (i.e.—TX REG) 80. The same reference numbers are used to denote the same elements.

MAIN RAM 50 has I/O 506 and input 504. TX REG 80 has input 82 and output 86. TX FIFO 40 has input 400, outputs 406 and 404. TX PACKER 30 has inputs 304 and 306 and outputs 300, 302 and 310.

Inputs 201–208 of SI 28 are coupled to communication channels 181–188, respectively. Inputs 210 and 212 of SI 28 are coupled to outputs 300 and 302 respectively. Output 214 of SI 28 is coupled to input 504 of MAIN RAM 50 and to input 304 of TX PACKER 30. I/O 306 of TX PACKER 30 is coupled to I/O 506 of MAIN RAM 50. Input 502 of MAIN RAM 50 is coupled to output 86 of TX REG 80. Input 82 of TX REG 80 is coupled to bus 333. Input 400 of TX FIFO 40 is coupled to output 310 of TX PACKER 30. Output 404 of TX FIFO 40 is coupled to bus 333. Output 406 of TX FIFO 40 is coupled to input 154 of MRH 150.

When MCC 100 is initialized, CPU 160 sends to input 502 of MAIN RAM 50, via input 82 and output 86 of TX REG 80, a set of initialization words with their corresponding j 333. TX REG 80 writes the initialization word to a memory word within MAIN RAM 80, which contains data words and initialization words concerning the j'th communication channel. Conveniently, the address of that word is determined by j 333. Preferably, the j'th memory word of MAIN RAM 50 stores data concerning the j'th communication channel. For convenience of explanation, this memory word is denoted as j_word, and its address is denoted as j_add.

For example, and without limiting the scope of the invention, if SI 28 is coupled to 256 communication channels, then j can have values ranging from 1 to 256. MAIN RAM 50 stores 256 data words, a data word for each channel. If the third communication channel sends a data packet, j=3 and the data packet will be written to the third data word of MAIN RAM 50.

Figure 5:
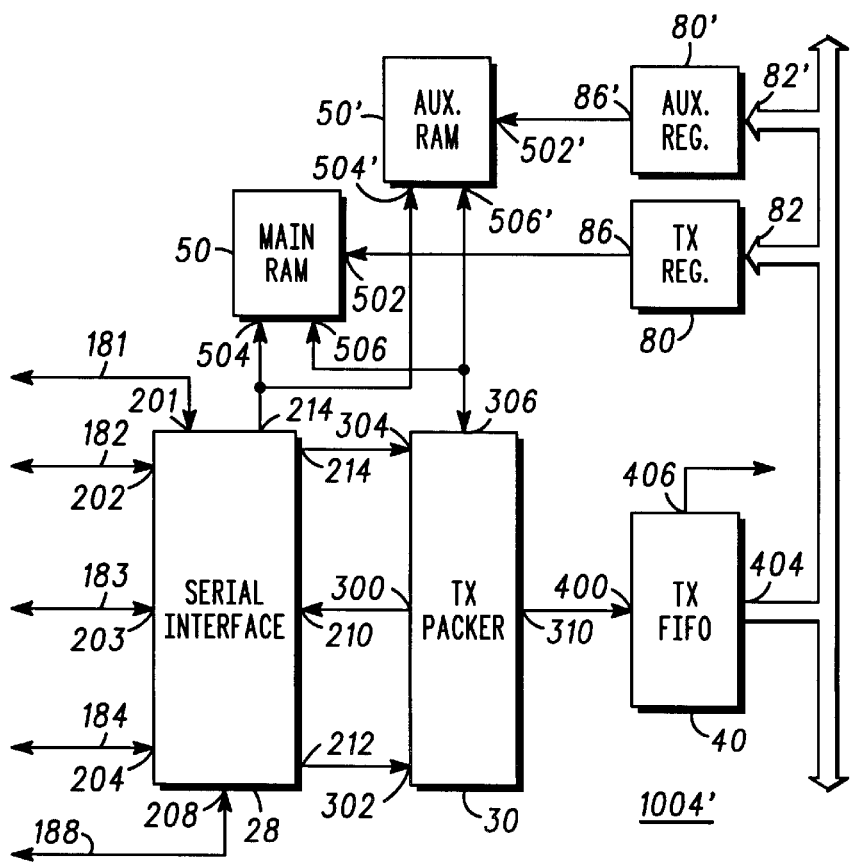
FIG. 5 is a simplified schematic diagram of a transmission portion of the multi channel controller, according to another preferred embodiment of the invention.
Figure 7:
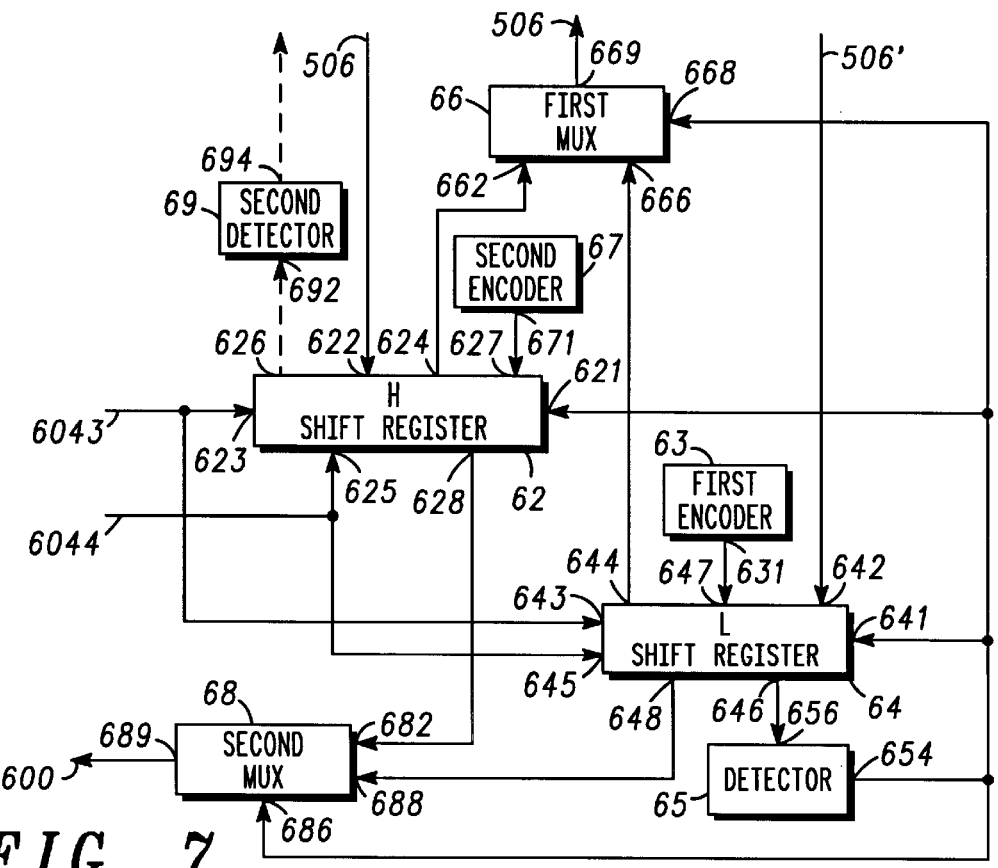
FIG. 7 is a simplified schematic diagram of transmit packer, according to a preferred embodiment of the invention.

The initialization words can contain data to be transmitted to SI 28, or contain a code which means that MAIN RAM 50 is empty, as explained in further detail in accordance to FIGS. 5 and 7, but this is not necessary and the initialization words can have other contents. CPU 160 can send data words, which are transmitted to SI 28, during the initialization of MCC 100, or as a result of processing a data word or after receiving a request from MCC 100, and for various other reasons.

SI 28 controls the transmission of the data packets which are stored within MAIN RAM 50 to communication channels 181–188. When a data packet is sent to the j'th communication channel, SI 28 sends j, through output 214 to input 504 of MAIN RAM 50, resulting in sending j_word from MAIN RAM 50 to TX PACKER 30.

When j_add is empty, MCC 100 can receive a data word from CPU 160. TX PACKER 30 sends j 333 to TX FIFO 40, via output 310 of TX PACKER 30 and input 400 of TX FIFO 40. TX FIFO 40 sends a transmit request signal, via output 406, to MRH 150. MRH 150 causes CPU 160 to read the content of TX FIFO 40 and send a data word to j_word. CPU 160 can read the content of TX FIFO 40 via output 404 of TX FIFO 40. CPU 160 sends a data word to MAIN RAM 50, with its j, via TX REG 80.

FIG. 5 is a simplified schematic diagram of a transmission portion 1004' of MCC 100 according to another preferred embodiment of the invention. Portion 1004' of FIG. 5 is analogues to portion 1004 of FIG. 4, but also has an auxiliary transmit register (AUX FIFO) 80' and an auxiliary memory bank (i.e.—AUX RAM) 50'. As explained in further details in connection to FIG. 7, TX PACKER 30' of FIG. 5 is analogues TX PACKER 30 of FIG. 4, but has additional elements. Portion 1004' can also have just a single TX REG 80, coupled to both MAIN RAM 50 and AUX RAM 50'. When portion 1004' is initialized CPU 160 writes a set of initialization words, for MAIN RAM 50 and AUX RAM 50 to TX REG 80.

When MCC 100 is initialized, CPU 160 writes to MAIN RAM 50 and AUX RAM 50' two sets of initialization word. Each word can be attached to its j 333. The first set of data words are sent to MAIN RAM 50, via TX REG 80, as explained in connection to FIG. 4. The second set of data words is sent to AUX RAM 50' via AUX REG 80' in the same manner.

MCC 100 stores two consecutive data words for each channel, wherein the first data word (i.e.—j_word) is stored at j_add in MAIN RAM 50 and the consecutive data word (i.e.—j_aword) is stored at j_aadd of AUX RAM 50'.

When MCC 100 transmits a data packet to SI 28, it starts to transmit data bits of j_word. If a data packet is stored in both j_add and j_aadd, having a first part at j_add and a second part at j_aadd, the first part is transmitted, followed by the second part.

When j_add is empty, MCC 100 can receive a data word from CPU 160. TX PACKER 30 sends j 333 to TX FIFO 40, via output 310 of TX PACKER 30 and input 400 of TX FIFO 40. TX FIFO 40 sends a transmit request signal, via output 406, to MRH 150. MRH 150 causes CPU 160 to read the content of TX FIFO 40 and send a data word to j_aword. CPU 160 can read the content of TX FIFO 40 via output 404 of TX FIFO 40. CPU 160 sends a data word to AUX RAM 50, with its j, via AUX REG 80'. Before a data word is written to j_aadd, the previous j_aword is sent to j_add.

Figure 6:
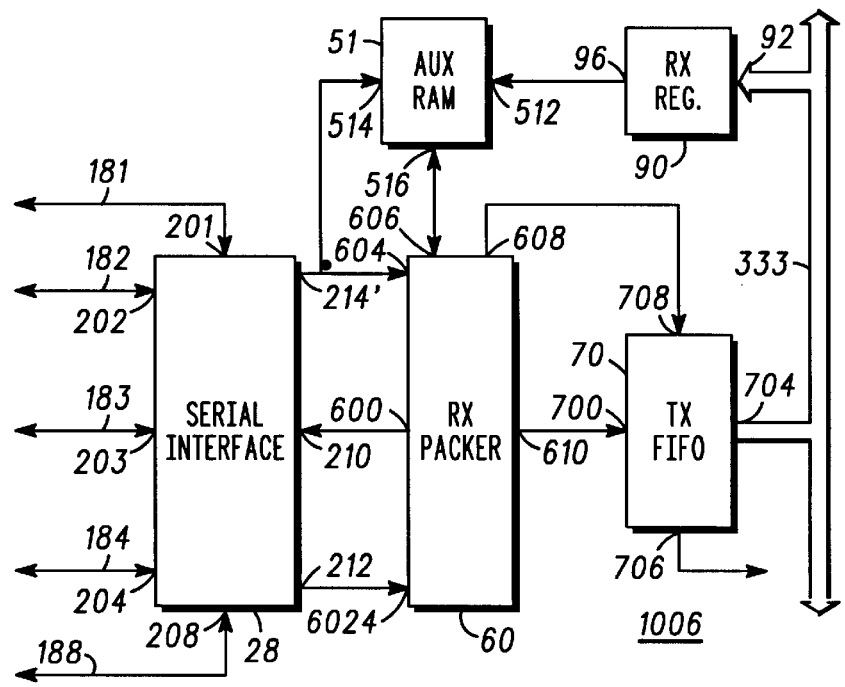
FIG. 6 is a simplified schematic diagram of receiving portion of the multi channel controller, according to a preferred embodiment of the invention.

FIG. 6 is a simplified schematic diagram of receiving portion 1006 of MCC 100 according to a preferred embodiment of the invention. Receiving portion 1006 comprises of SI 28, receive packer (i.e.—RX PACKER) 60, receive stack (i.e.—RX. FIFO) 70, memory bank (i.e.—RX RAM) 51 and receive register (i.e.—RX. REG) 90. RX PACKER 60 has inputs 600, 6024, and 604, outputs 608 and 610 and I/O 606. RX FIFO 70 has inputs 700 and 708 and outputs 706 and 704. RX RAM 51 is analogues to MAIN RAM 50 of FIGS. 4–5. RX RAM 51 has I/O 516 and inputs 512 and 514. SI 28 is analogues to SI 28 of FIGS. 1, 4 and 5. RX REG 90 has input 92 and output 96.

Inputs 600 and 6024 of RX PACKER 60 are coupled to outputs 210' and 212 of SI 28 accordingly. Input 604 of RX PACKER 60 and input 514 of RX RAM 51 are coupled to output 214' of SI 28. I/O 606 of RX PACKER 60 is coupled to I/O 516 of RX RAM 51. Output 608 of RX PACKER 60 is coupled to input 708 of RX FIFO 70. Output 706 of RX FIFO 70 is coupled to input 157 of MRH 150. Input 92 of RX REG 90 and output 704 of RX FIFO 70 are coupled to bus 333. Output 96 of RX REG 90 is coupled to input 512 of RX RAM 51.

When MCC 100 is initialized, CPU 160 writes to RX RAM 51 a set of initialization words, via RX REG 90. The initialization words can indicate that RX RAM 51 is empty. Each initialization word can be accompanied by its j 333.

SI 28 controls the reception of data packets from communication channels 181–188, to RX RAM 51. SI 28 sends j 333, through output 214 to input 514 of RX RAM 51. After receiving an RXSTART 6043' signal, RX PACKER 60 reads a data word which can contain data previously sent from the j'th communication channel (i.e.—j_rword) which is stored at j_radd of RX RAM 51.

RX PACKER 60 receives data bits from SI 28 and shifts the its content accordingly. When RX PACKER 60 receives a RXEND signal 6044', he writes its content to j_radd.

When RX PACKER 60 is full (i.e.—it contains a whole data word) it writes the j_rword, and j 333 to RX FIFO 70, via output 608 and input 708, j 333 is send to RX FIFO 70 via output 608 and input 708. RX FIFO 70 sends a receive request, via output 706 to MRH 150. MRH 150 causes CPU 160 to read the content of RX FIFO 70 and to process the data word stored within RX FIFO 70. For example, CPU 160 can respond to the receive request as a result of an interrupt sent from MRH 150, and can also scan MRH 150 in a periodic manner.

When CPU 160 handles a receive request, it reads the content of RX FIFO 70 and processes the data word previously stored in it. After a data word is read, CPU 160 resets j_radd.

FIG. 7 is a simplified schematic diagram of transmit packer 30' according to a preferred embodiment of the invention.

Transmit packer 30' comprises of a low shift register (i.e.—LSR) 64, a high shift register (i.e.—HSR) 62, a first multiplexer (i.e.—first mux) 66, a second multiplexer (i.e.—second mux) 68, a detector 65, a first encoder 63, and a second encoder 67. TX PACKER 30' can also have second detector 69.

HSR 62 has inputs 621, 622, 623, 625 and 627 and outputs 624 and 628. HSR 62 can also have an additional output 626, which is coupled to second detector 69. LSR 64 has inputs 641, 642, 643, 645 and 647, and outputs 644, 646 and 648. Second encoder 67 has output 671. First encoder 63 has output 631. First mux 66 has inputs 662, 666 and 668 and output 669. Second mux 68 has inputs 682, 688 and 686 and output 689. Detector 65 has input 656 and output 654. Second detector 69 has input 696 and output 694.

Input 641 of LSR 64, input 668 of first mux 66 and input 686 of second mux 68 are coupled to output 654 of detector 65. Input 647 of LSR 64 is coupled to output 631 of first encoder 63. Input 642 of LSR 64 is coupled to I/O 506' of AUX RAM 50'. Output 644 of LSR 64 is coupled to input 666 of first mux 66. Output 646 of LSR 64 is coupled to input 656 of detector 65. Output 648 of LSR 64 is coupled to input 688 of second mux 68. Input 627 of HSR 62 is coupled to output 671 of second encoder 67. Input 622 of HSR 62 is coupled to I/O 506 of MAIN RAM 50. Output 624 of HSR 62 is coupled to input 662 of first mux 66. Output 628 of HSR 62 is coupled to input 682 of second mux 68. Output 669 of first mux 66 is coupled to I/O 506 of MAIN RAM 50. Output 689 of second mux 68 is coupled to output 300 of MCC 100. Input 643 of LSR 64 and input 623 of HSR 62 are coupled to input 6043 of MCC 100. Input 645 of LSR 64 and input 625 of HSR 62 are coupled to input 6044 of MCC 100. Output 626 of HSR 62 is coupled to input 692 of second detector 69.

Detector 65 detects if LSR 64 is empty, and accordingly outputs a detection signal, via output 654. The detect signal is used to enable LSR 64 and HSR 62 alternately, and to determine if HSR 62 or LSR 64 transmits data to SI 28 and if the content of LSR 64 or HSR 62 is sent to MAIN RAM 50. If LSR 64 is not empty, LSR 64 starts to shift its content, second mux 68 selects input 688, which is coupled to output 648 of LSR 64, and when a transmission of a data packet ends, first mux 66 selects input 666, which is coupled to output 644 of LSR 64. Accordingly, TX PACKER 30' transmits a data packet which is stored within LSR 64, and the content of LSR 64 is written to MAIN RAM 50 when a transmission of data packet ends.

If detector 65 detects that LSR 64 is empty, HSR 64 starts to shift its content and second mux 68 and first mux select inputs 682 and 662. Accordingly, TX PACKER 30' transmits a data packet which is stored within HSR 62, and the content of HSR 62 is written to MAIN RAM 50 when a transmission of data packet ends. The selected shift register (HSR 62 or LSR 64) shift its content after receiving a TXSTART signal 3043' via inputs 623 or 643 accordingly. When a TXEND signal 3044' arrives the transmission ends and the content of the currently selected shift register (HSR 62 or LSR 64) is written to j_add. For example, if LSR 64 is not empty when a TXSTART signal 3044 is received, LSR 64 starts to shift its content and transmit data to SI 28. If a TXEND signal 3044' is received before LSR is empty, the content of LSR 64 is written to j_add. If LSR 64 starts to transmits data, and before receiving a TXEND signal 3044, LSR 64 is emptied, HSR 623 starts to shift its content and transmits data to SI 28. When a TXEND signal is received, the content of HSR 62 is written to j_add.

Output 628 can be coupled to the least significant bit (i.e.—LSB) of HSR 62 and the content of HSR 62 is shifted to the right. When the content of LSR 64 (HSR 62) is shifted, first encoder 63 (second encoder 67) sends a code bit to the most significant bit (i.e.—MSB) of LSR 64 (HSR 62).

For example, if LSR 64 transmits its MSB and shifts its content to the left, encoder 63 sends a code bit to the LSB of LSR 64. The code bits sent by encoder 63 form a code word. Detector 65 compares the content of LSR 62 to the code word, and when there is a match, it detects that LSR 64 is empty. HSR 62 is coupled to second encoder 67, which sends HSR 62 the same code as first encoder 63 sends to LSR 64.

Figure 8:
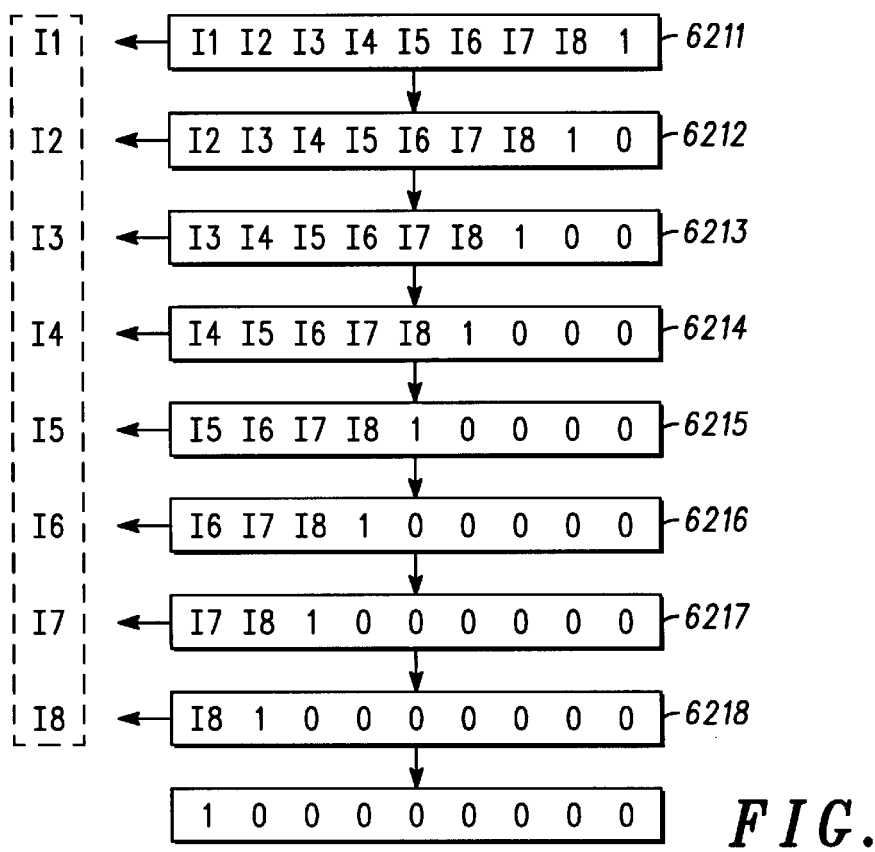
FIG. 8 is a schematic description of the content of a transmit packer, during a transmission of a data packets, according to a preferred embodiment of the invention.

For example, in reference to FIG. 8, MAIN RAM 50 contains a data word 6211 which has to be transmitted to communication channel 182. A code which is sent to LSR 62 by first encoder is (100000000)2. The "1" can also be supplied by a status bit stored in MAIN RAM 50 in addition to the data words. Data word 6211 comprises of two data packets. The first data packet is (11, 12, 13, 14)2, and the second data packet is (15, 16, 17, 18.)2, 11, 12, . . . 18 can have values of "0" or "1". When a TXSTART signal 3043' arrives MAIN RAM 50 writes to LSR 62 data word 6211 and the first data bit 11 is transmitted. After the transmission of 11, the content of LSR 62 is shifted to the left. LSR 64 now contains a shifted data word 6212, with a LSB of "0", the LSB is sent from first encoder. LSR 64 transmits data bit 12 and shifts its content to the left. LSR 64 now contains further shifted data word 6213. These steps are repeated until a data packet containing 11, 12, 13 and 14 are transmitted, and LSR 64 contains another shifted data word 6214 having the following bits: 15, 16, 17, 18, 0,0,0,0. After a data packet is transmitted to SI 28, SI 28 sends a TXEND signal 3044', which causes the content of LSR 62 (i.e.— another shifted data word 6214) to be sent to MAIN RAM 50 (this step is denoted as 62_2 in FIG. 8). TX PACKER 30 (30') can handle other communication channels out of 181–188, according to j 333 from SI 28. When SI 28 decides that there is a need to transmit the second data packet to channel 182 it sends a TXSTART signal 3043' to MAIN RAM 50, so that another shifted data word 6214 is written to LSR 64 (this step is denoted as 62_3 in FIG. 8). The second data packet is transmitted in the same manner as described above. After the last data bit 18 is transmitted, the content of LSR 64 equals (100000000)2. Detector 65 compares the content of LSR 64 to code (100000000)2 and detects that LSR 64 is empty. Detector 65 (not shown in FIG. 8) can be comprised of a series of inverting gates, coupled to all bits but MSB of LSR 64, wherein the outputs of all the inverting gates, and the MSB of LSR 64 are coupled to the inputs of an AND gate.

Figure 9:
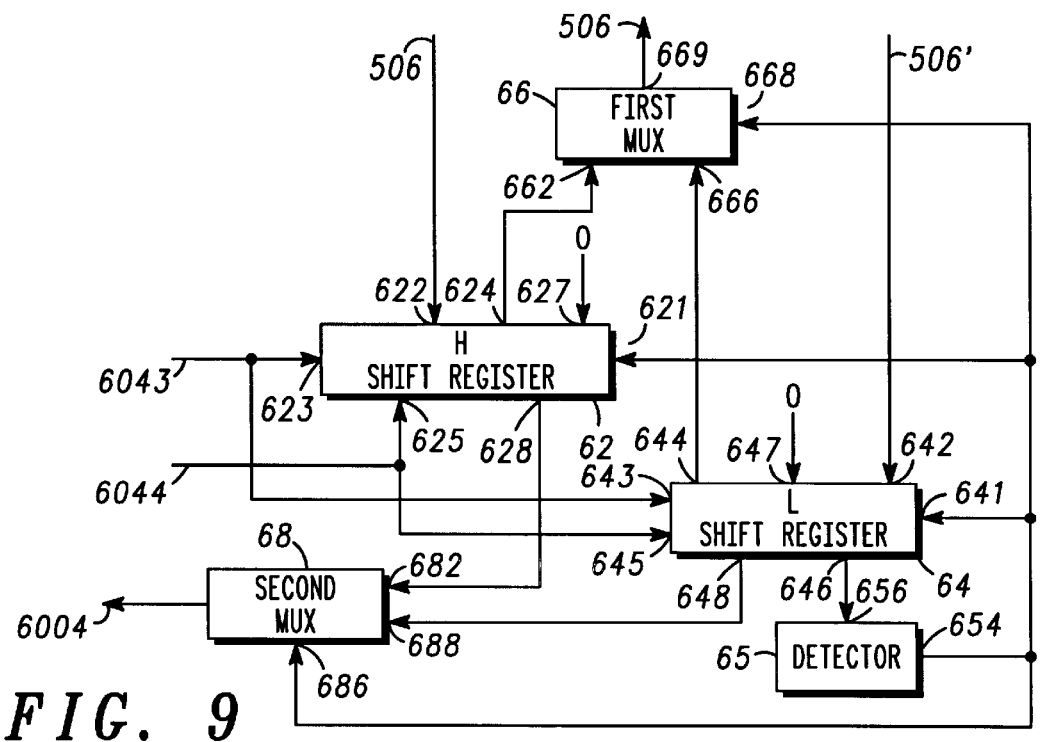
FIG. 9 is a simplified schematic description of a transmit packer, according to further preferred embodiment of the invention.

FIG. 9 is a simplified schematic description of a transmit packer (i.e.—TX PACKER) 30", according to further preferred embodiment of the invention. TX PACKER 30" is analogues to TX PACKER 30' of FIG. 7, wherein first encoder 63 and second encoder 67 are implemented by connecting one of the bits of LSR 64 and HSR 62 to the ground. The code which is sent to LSR 62 by first encoder is (100000000)2. The "1" is supplied by a status bit stored in MAIN RAM 50 in addition to the data words As shown in FIG. 9, the code can be produced by inputting "0" to LSR 64, and the LSB can be one of the status bits sent with a previous data word. If LSR 64 content is 11,12,13,14, . . . 1 DW, than after LSR 64 transmits its MSB—11, it shifts to the left and it content is 12,13,14, . . . 1DW, 0. After transmitting an additional bit, and shifting the content of LSR 62 to the left, the content of LSR 62 is 13,14, . . . 1DW, 0,0. After DW bits of data are sent, the content of LSR 64 is 00..001 and detector 65, which compares the content of LSR 64 to the code, detects that LSR 62 is empty.

Figure 10:
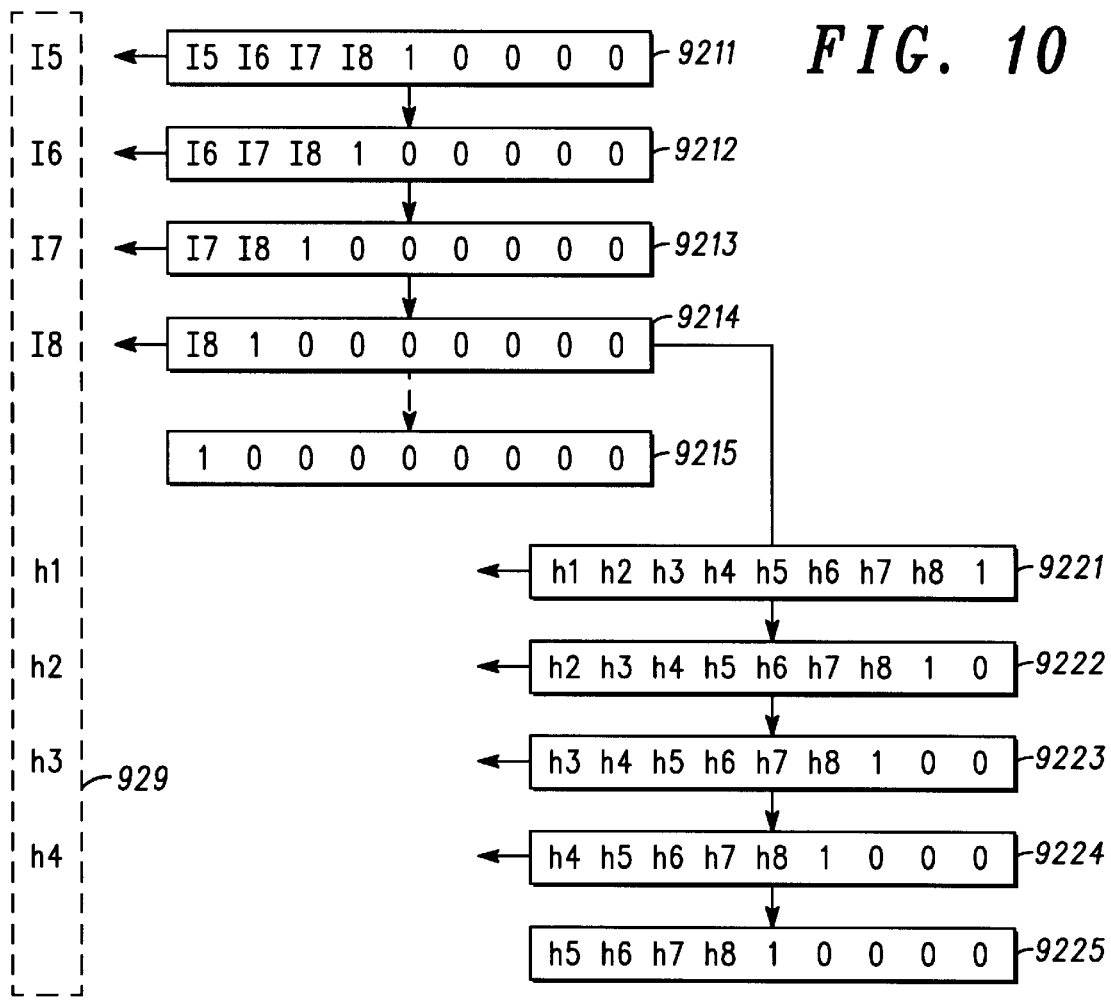
FIG. 10 is a schematic description of the content of a transmit packer, during a transmission of a data packets, according to another preferred embodiment of the invention.

For example, in reference to FIG. 10, a data packet is of 8 bits long, and it is comprised from the following bits: 15, 16, 17, 18, h1, h2, h3, h4. LSR 62 contains a first word 9211. The content of first 9211 word is 15, 16, 17, 18, 1, 0, 0, 0, 0. HSR 64 contains a second data word 9221. The content of second word 9221 is h1, h2, h3, h4, h5, h6, h7, h8, 1. When TX PACKER 30 receives a TXSTART signal 3043' is transmits data bit 15, and shifts its content. The LSB of LSR 64 receives "0". This process continues (and shifted first words 9212, 9213, 9214 and 9215 are produced) until l8 is transmitted, the content of LSR 64 is shifted and the MSB of LSR 64 receives "1", to form shifted first word 9215. Shifted data word 9215 equals the code and detector 65 sends a signal indicating that LSR 64 is empty. The signal causes HSR 62 to start to transmit its content (i.e.—second word 9221) . HSR 62 transmits h1 and shifts its content. The LSB of HSR 62 receives "0". This process continues (and shifted second words 9222, 9223, 9224 and 9225 are produced) until h4 is transmitted, the content of HSR 62 is shifted and a TXEND signal 3044' is sent from SI 28 to TX PACKER 30'. The content of HSR 62 (i.e.—shifted second word 9225) is sent to MAIN RAM 50. The data stream 929 outputted from TX PACKER 30' is 15, 16,17,18, h1, h2, h3, h4.

Figure 11:
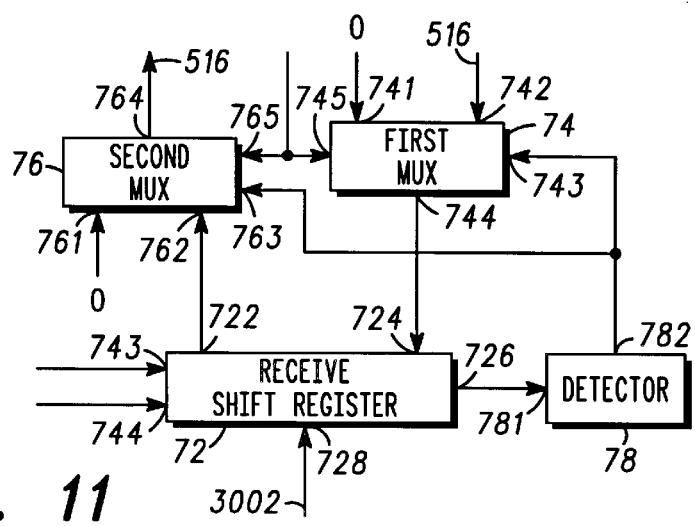
FIG. 11 is a simplified schematic diagram of a transmit packer, according to a preferred embodiment of the invention.

FIG. 11 is a simplified schematic diagram of RX PACKER 60 according to a preferred embodiment of the invention. RX PACKER 60 comprises of a receive shift register (i.e.—RSR) 72, receive detector 78, a first receive multiplexer (i.e.—FRM) 74 and a second receive multiplexer (i.e.—SRM) 76.

RSR 72 has inputs 723, 724, 725 and 728 and outputs 722 and 726. Receive detector 78 has input 781 and output 782. FRM 74 has inputs 741, 742, 743 and 745 and output 744. SRM 76 has inputs 761, 762, 763 and 765 and output 764.

Input 723 of RSR 72 is coupled to input 6043 of MCC 100, for receiving RXSTART signal 6043'. Input 724 of RSR 72, input 745 of FRM 74 and input 765 of SRM 76 are coupled to input 6044 of MCC 100, for receiving RXEND signal 6044'. Input 728 of RSR 72 is coupled to input 300 of MCC 100, for receiving data. Output 726 of RSR 72 is coupled to input 781 of receive detector 78. Input 724 of RSR 72 is coupled to output 744 of FRM 74. Output 722 of RSR 72 is coupled to input 762 of SRM 76 and can be coupled to input 700 of RX FIFO 70. Output 782 of receive detector 78 is coupled to input 743 of FRM 74 and input 763 of SRM 76. Input 742 of FRM 74 and output 764 of SRM 76 are coupled to I/O 516 of RX RAM 51. Input 741 of FRM 74 and input 761 of SRM are coupled to constant k 75. Conveniently k=(100000000)2.

RXSTART signal 6043' enables RSR 72 to receive data bits from SI 28, and RXEND signal 6044' disables RSR 72. When an RXSTART signal 6043' is sent from SI 28, RX RAM 51 writes j_rword to RSR 72. After receiving RXSTART signal 6043', RSR 72 starts to receive data bits appearing at input 728. Each received data bit causes RSR 72 to shift its content. For example, if input 728 is coupled to the most significant bit (i.e.—MSB) of RSR 72, a data bit which appears at input 728 is stored at the MSB of RSR 72, and the previous content of RSR 72 is shifted towards the least significant bit (i.e.—LSB) of RSR 72. Input 728 can be coupled to RSR 72 LSB, so that a received data bit causes RSR 72 to shift its content towards the MSB of RSR 72.

Input 781 of receive detector 78 is coupled to output 726 of RSR 72, for detecting when RSR 72 register is full. If detector 78 detects that RSR 72 is full, detector 78 sends a FULL signal 608', via output 608, to RX FIFO 70, FRM 74 and SRM 76. FULL signal 608' causes the content of SRS 72 to be stored within RX FIFO 70, with the corresponding j, which is sent by SI 28, via MCC 100, to RX FIFO 70.

If RSR 72 receives an RXEND signal 6044' before RSR 72 is full, the content of RSR 72 is written to j_radd.

If RXEND signal 6044' is received at the same time when RSR 72 is filled, the content of RSR 72 is sent to RX_FIFO 70. SRM 76 selects input 761 and sends k 75 to j_radd.

If RSR 72 is filled before RXEND signal 6044' is received, the content of RSR 72 is written to RX FIFO 70, with the corresponding j 333. J 333 can be sent from SI 28, via RX PACKER 60. FRM 74 selects input 741, which causes k 75 to be written to RSR 72. After k 75 is written, RSR 72 continues to receive data from SI 28. Detector 78 searches for a FULL flag 777, which appears at output 726 when RSR 72 is full.

Figure 12:
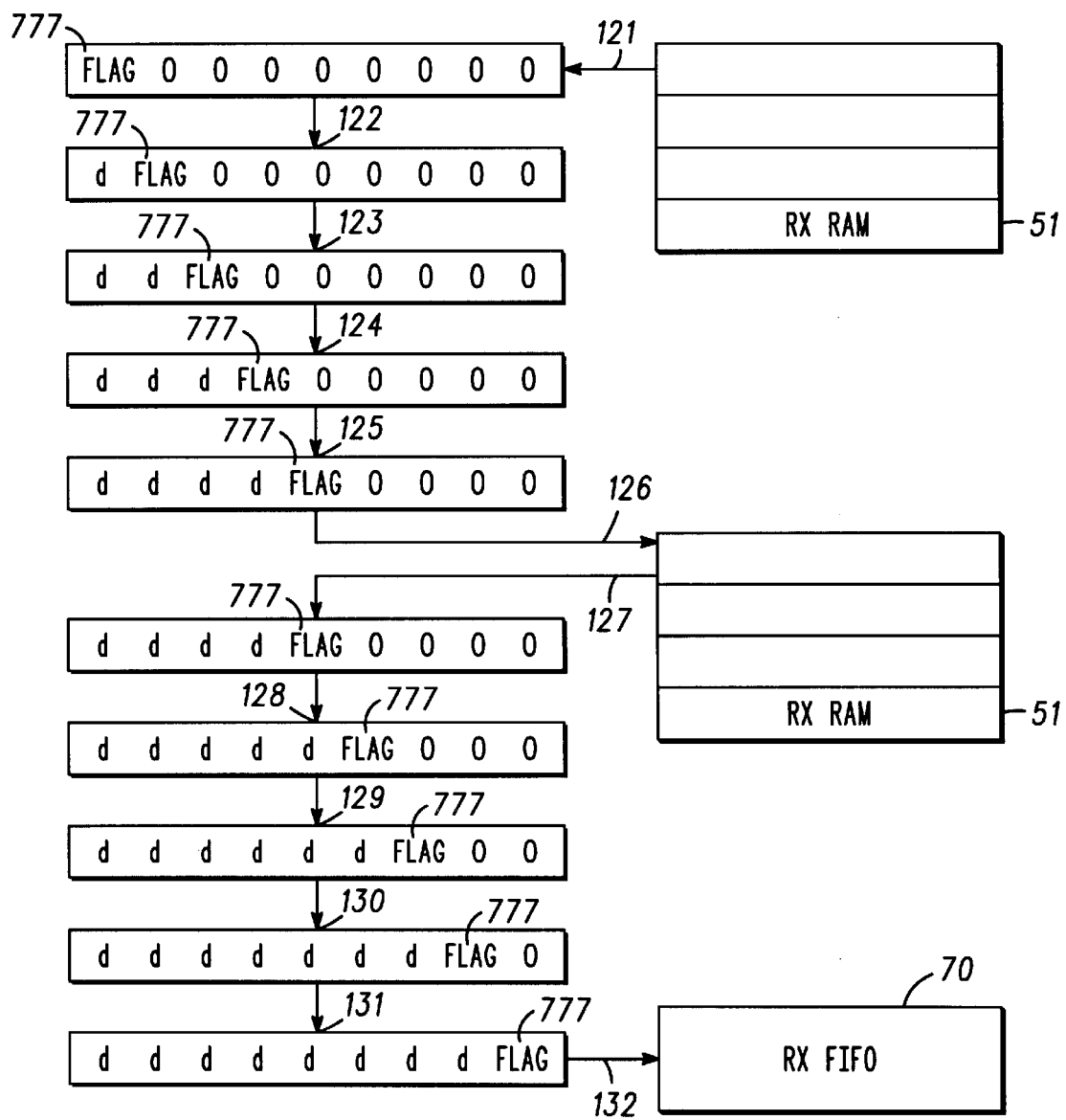
FIG. 12 is a schematic description of the content of an receive packer, during a transmission of a data packets, according to an embodiment of the invention.

For example, in reference to FIG. 12, a reception of two data packets from the fourth communication channel 185 is shown. In FIG. 12 the content of RSR 51 is shown. J 333 equals five . RX RAM 51 has 9-bit memory words, RSR 72 is a 9-bit shift register and each data packet is 4 bits long. FULL flag 777 is a single bit which equals "1". Data packets which are received from communication channel 185 are stored in the fifth memory word of RX RAM 51 (e.g.—j_radd is the address of the fifth word of RX RAM 51). Receive detector 78 is coupled to the LSB of RSR 72. When RX RAM 51 is initialized, CPU 160 writes an initialization word 9311 (100000000)2 to the fourth memory word of RX RAM 51, the MSB of the initialization word 9311 is FULL flag 777, and the other bits are "0". After receiving a RXSTART signal 6043', and after receiving j 333, the content of the fourth memory word of RX RAM 51 is loaded to RSR 72, as indicated by line 121 . During the reception of data from SI 28, data bits are written to RSR 72, which accordingly shifts its content to the right, as indicated by lines 122–125. This process repeats until a data packet of 4 bits is received, and a TXEND 6044' signal causes the content of RSR 72 to be sent to the fifth data word of RX RAM 51, as indicated by line 126. When SI 28 decides to receive another data packet from communication channel 185, then as indicated by line 127, the content of the fifth memory word of RX RAM 51 is sent to RSR 72.

When receiving data bits, RSR 72 shift its content to the right, as indicated by lines 128–131. This process repeats until RSR 72 is filled—FULL flag 777 is shifted to the LSB of RSR 72. As indicated by line 132, the content of RSR 72 is then sent to RX FIFO 70.

Figure 13:
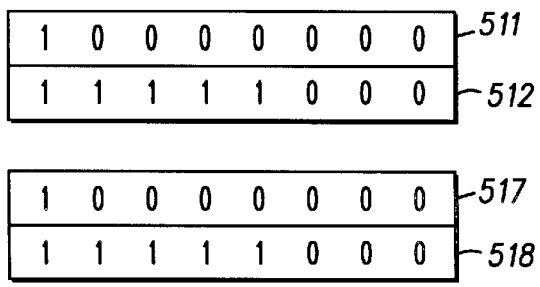
FIG. 13 is a schematic description of the content of a memory, according to a preferred embodiment of the invention.

FIG. 13 is a schematic description of the content of RX RAM 51, according to a preferred embodiment of the invention.

If all memory words 511–518 of RX RAM 51 are initialized with the same initialization word, and if many communication channels are active simultaneously, many memory words will be filled simultaneously, causing many receive requests to be sent simultaneously to MRC 150. This can be avoided by initializing RX RAM 51 by a variety of initialization words IWO), having FULL flags 777 in different locations, j being an index having values of 1 to M, where M is the number of communication channels. Conveniently, M equals to the depth of RX RAM 51—the number of memory words within RX RAM 51. Each initialization word IWO) has an variable number of EMPTY bits 888 followed by a FULL flag 777. CPU 160 ignores EMPTY bits 88, and does not process them.

For example, in HDLC communication protocol the combination of (11111111)2 is not regarded as valid data. When SI 28 sends a data packet having value of (11111111)2, CPU 160 does not process the data packet. RX RAM 51 and RSR 72 can store 17-bit words. When CPU 160 can handle receive requests from half the communication channels, a first half of the memory words 511 . . . 517 of RX RAM 51, which store the data which is received from communication channels 181 . . . 187 accordingly, receive a first initialization word having value of (10000000000000000)2 and the remaining memory words 512, 514, 516 and 518, which store the data which is received from the remaining communication channels 182, 184, 186 and 188, receive a second initialization word of (11111111100000000)2. Each memory word of the first half of memory words 511, 513, 515 and 517 is filled after receiving 16 data bits. The other memory words are filled after receiving just 8 data bits.

After RSR 72 is filled, j_radd is reset by a reset word. Conveniently, the reset word equals (10000000000000000) 2.

Status signal 6046' controls the size of data words to be sent to CPU 160. Status signal 6046' is received by CPU 160 which accordingly can send reset words of initialization words having FULL flag 777 in different locations. For example, if . RX RAM 51 and RSR 72 can store 17-bit words and status signal 6046' indicated that the each byte of the j'th communication channel will be sent to CPU 160, then the initialization word and the reset word which will be written to j_radd are equal (11111111100000000)2.

Figure 14:
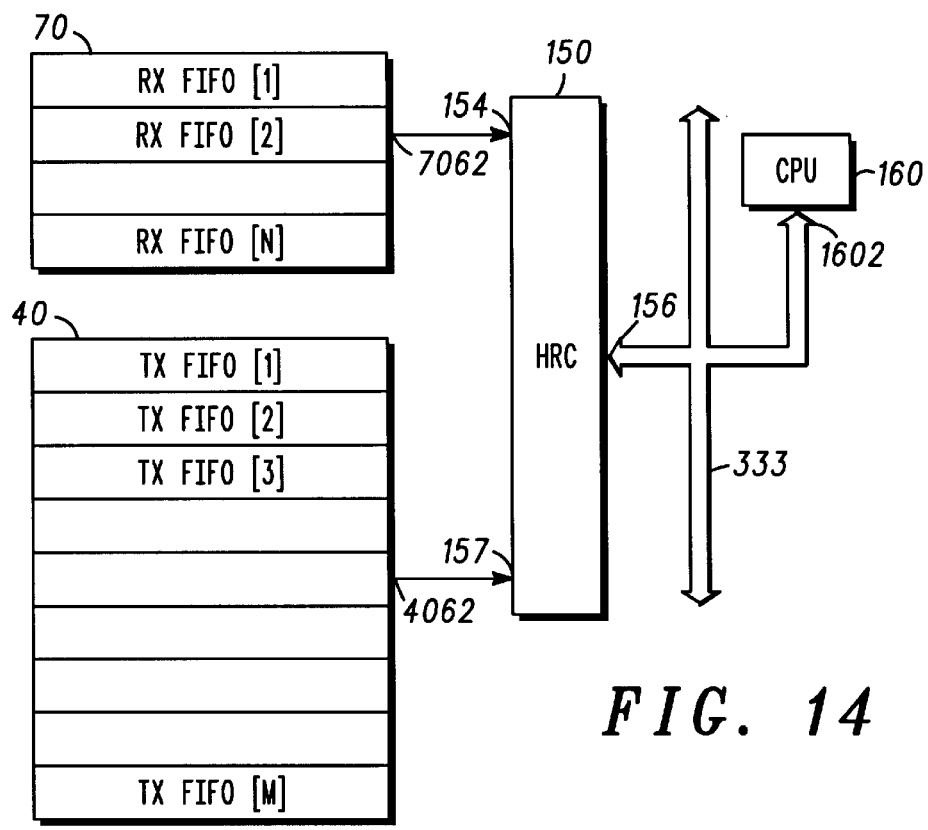
FIG. 14 is a schematic description the interface between the multi channel controller and a CPU.

FIG. 14 is a schematic description the interface between MCC 100 and CPU 160. Interface 1006 comprises of: RX FIFO 70, TX FIFO 40, HRC 150, CPU 160 and, according to a preferred embodiment of the invention. RX FIFO 70 has A words of B bits each. Each word is comprised of B1 bits of data and B2 bits of #ch flag. TX FIFO 40 has C words of B2 bits. Each word comprises of B2 bits of #ch flag. RX FIFO 70 words are much longer than TX FIFO 40 words. RX FIFO 70, which has longer words than TX FIFO 40, has less words than TX FIFO 40 (i.e.—A<C), so that both RX FIFO 70 TX FIFO 40 are of relatively compact size.

A length of a FIFO usually determines its latency—a FIFO which has few words has to be read quite frequently, otherwise some of its data words can be overwritten by incoming data. In order to compensate RX FIFO 70 for its smaller number of words, it requests to HRC 150 are given a higher priority than the requests of TX FIFO 40. The requests of RX FIFO 70 can also be polled more frequently than the requests of TX FIFO 40.

Figure 15:
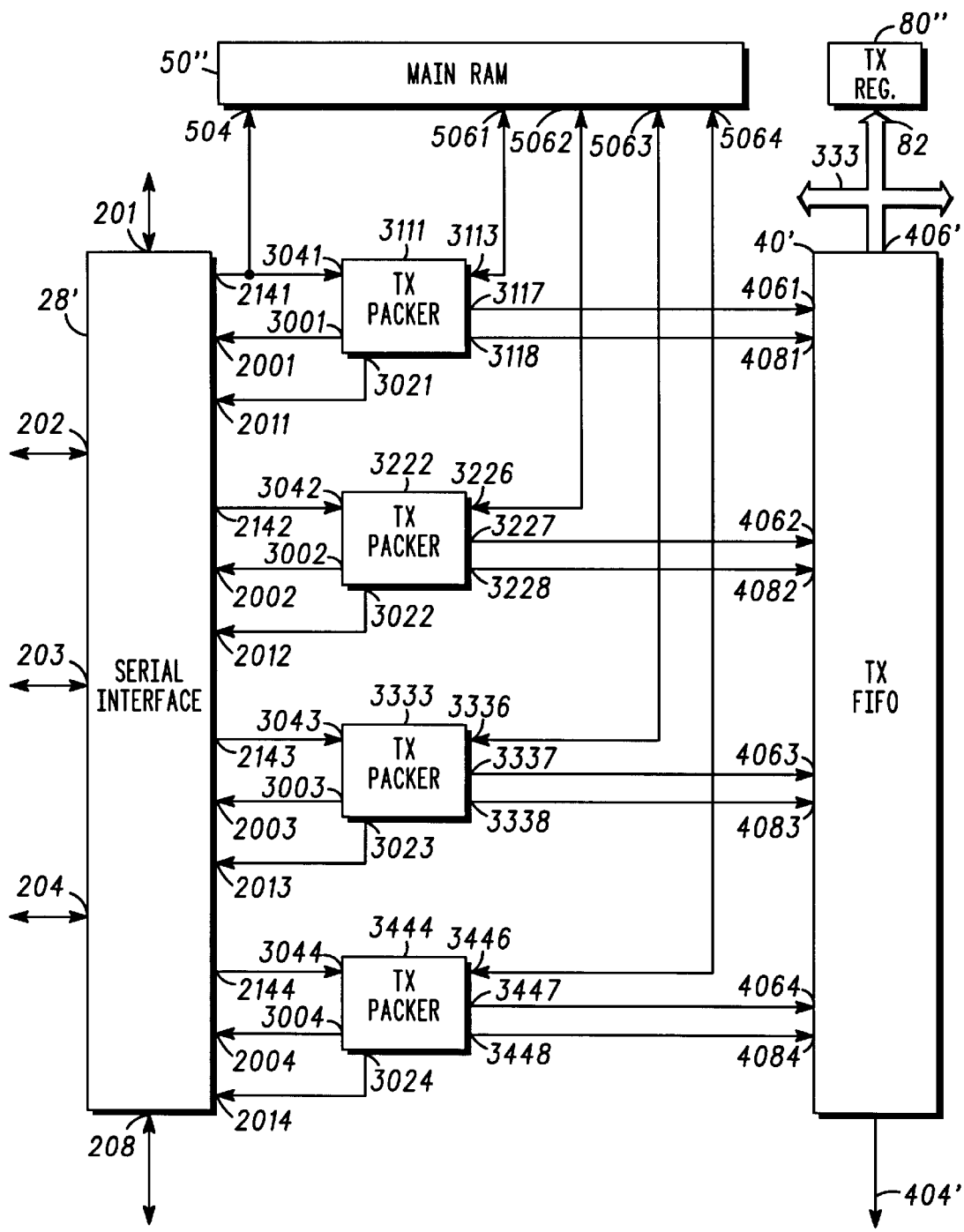
FIG. 15 is a schematic diagram of a transmit section of the of the multi channel controller, according to a preferred embodiment of the invention.
Figure 16:
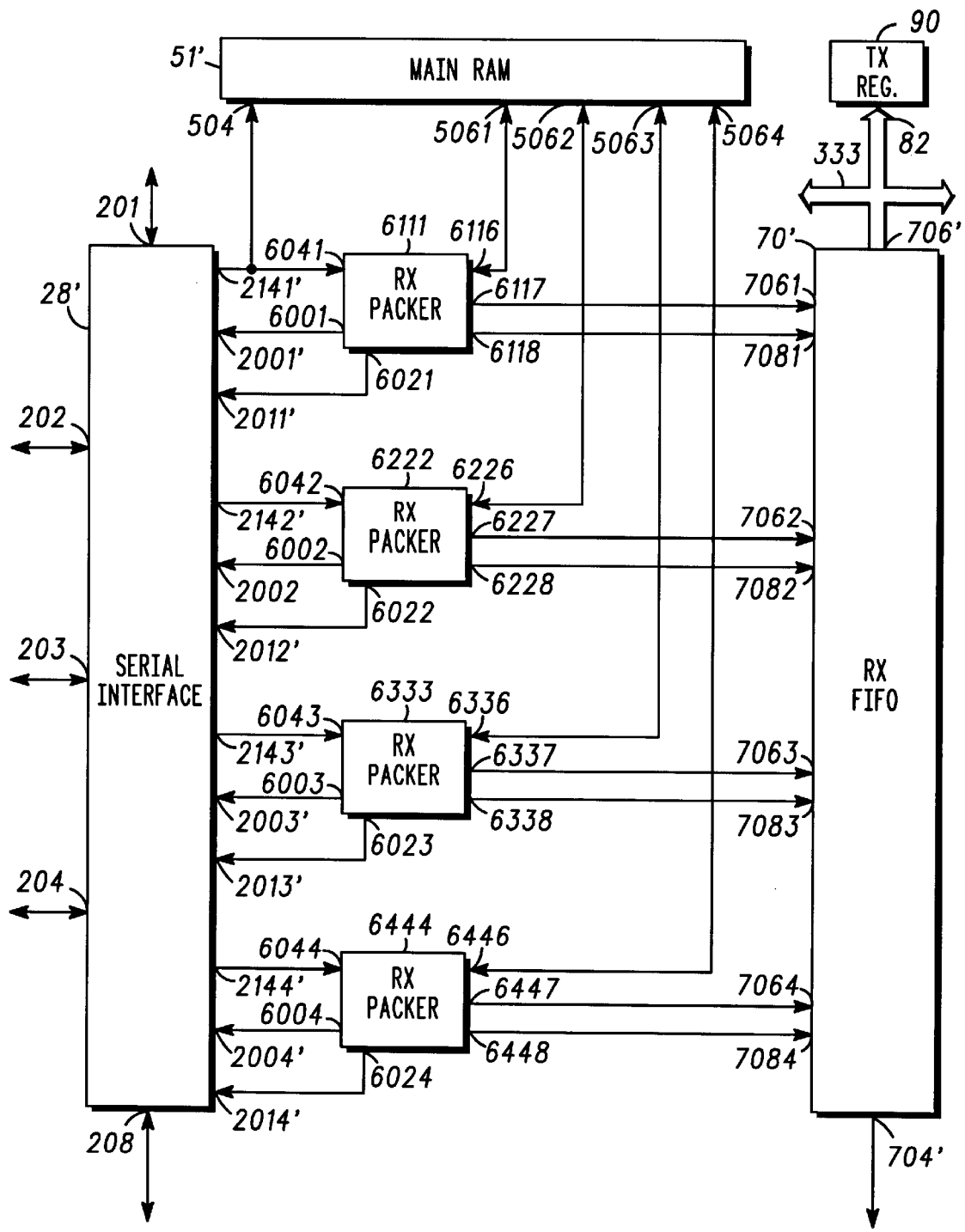
FIG. 16 is a schematic diagram of a receive section of the multi channel controller, according to a preferred embodiment of the invention.

FIG. 15 is a schematic diagram of transmit section 1005" of MCC 100, according to a preferred embodiment of the invention. Transmit section 1005" is analogues to transmit section 1005 of FIG. 4 but it has four independent TX PACKERs 3111, 3222, 3333 and 3444. MAIN RAM 50 has I/O's 5061–5064. TX FIFO 40' has inputs 4061–4064, and 4081–4084 and outputs 406' and 404'. SI 28' has outputs 2141–2144, 2101–2104, 2061–2064 and 2041–2044 and I/O's 201–208. Each of the four TX PACKERs 3111, 3222, 3333 and 3444 is analogues to TX PACKER 30.I/O 3116, 3226, 3336 and 3446 of TX PACKERs 3111, 3222, 3333 and 3444 are analogues to I/O 306 of TX PACKER 30. Inputs 3001–3004 of TX PACKERs 3111, 3222, 3333 and 3444 are analogues to input 300 of TX PACKER 30. Inputs 30413044 of TX PACKERs 3111, 3222, 3333 and 3444 are analogues to input 304 of TX PACKER 30. Outputs 3118, 3228, 3338 and 3448 of TX PACKERs 3111, 3222, 6333 and 3444 are analogues to output 308 of TX PACKER 30. Inputs 3021–3024 of TX PACKERs 3111, 3222, 3333 and 3444 are analogues to input 302 of TX PACKER 30. Inputs 4081, 4082, 4083 and 4084 of TX FIFO 40' are analogues to input 400 of TX FIFO 40. MAIN RAM 50" of FIG. 16 is analogues to MAIN RAM 50 of FIG. 4, but has four I/O's 5061–5063, wherein each I/O is analogues to I/O 506 of MAIN RAM 50. Conveniently, all TX PACKERs 3111, 3222, 3333 and 3444 can read and write to and from MAIN RAM 50". Preferably, each TX PACKER of 3111, 3222, 3333 and 3444 is mapped to different locations in MAIN RAM 50, so that a memory word can be read or written by a single TX PACKER. TX FIFO 40' is analogues to TX FIFO 40 of FIG. 4, but preferably has more memory words than TX FIFO 40. TX FIFO 40' stores the receive requests of all four TX PACKERs 3111, 3222, 3333 and 3444.

Outputs 2141–2144 of SI 28' are coupled to inputs 3041–3044 of TX PACKERs 3111, 3222, 3333 and 3444. Outputs 2101–2104 SI 28' are coupled to inputs 3021–3024 of TX PACKERs 3111, 3222, 3333 and 3444; Outputs 2061–2064 SI 28' are coupled to inputs 3021–3024 of TX PACKERs 3111, 3222, 3333 and 3444. I/O's 3113, 3226, 3336 and 2446 of TX PACKERs 3111, 3222, 3333 and 3444 are coupled to I/O's 5601–5604 MAIN RAM 50'. Outputs 3117, 3227, 3337 and 3447 of TX PACKERs 3111, 3222, 3333 and 3444 are coupled to inputs 4061–4064 TX FIFO 40'. Outputs 3118, 3228, 3338 and 3448 of TX PACKERs 3111, 3222, 3333 and 3444 are coupled to inputs 4081–4084 TX FIFO 40'. Input 82" of TX REG 80" is coupled to bus 333. Output 86" of TX REG 80" is coupled to input 502 of MAIN RAM 50". Output 2141 of SI 28' is coupled to input 504 of MAIN RAM 50". Output 406' of TX FIFO 40' is coupled to bus 333. Output 404' of TX FIFO 40' is coupled to input 154 of MRH 150.

FIG. 16 is a schematic diagram of a receive section 1006" of MCC 100, according to a preferred embodiment of the invention. Receive section 1006" is analogues to receive section 1006 of FIG. 6 but it has four independent RX PACKERs 6111, 6222, 6333 and 6444. RX RAM 51 has I/O's 5061–5064. RX FIFO 70' has inputs 7061–7064, and 7081–7084. SI 28' has outputs 2141–2144, 2101–2104, 2061–2064 and 2041–2044 and I/O's 201–208. Each of the four RX PACKERs 6111, 6222, 6333 and 6444 is analogues to RX PACKER 60. I/O 6116, 6226, 6336 and 6446 of RX PACKERs 6111, 6222, 6333 and 6444 are analogues to I/O 606 of RX PACKER 60. Inputs 6001–6004 of RX PACKERs 6111, 6222, 6333 and 6444 are analogues to input 600 of RX PACKER 60. Inputs 6041–6044 of RX PACKERs 6111, 6222, 6333 and 6444 are analogues to input 604 of RX PACKER 60. Outputs 6118, 6228, 6338 and 6448 of RX PACKERs 6111, 6222, 6333 and 6444 are analogues to output 608 of RX PACKER 60. Inputs 6021–6024 of RX PACKERs 6111, 6222, 6333 and 6444 are analogues to input 602 of RX PACKER 60. Inputs 7081, 7082, 7083 and 7084 of RX FIFO 70' are analogues to input 708 of RX FIFO 70.

Outputs 2141–2144 are coupled to inputs 6041–6044. Outputs 2101–2104 are coupled to inputs 6021–6024; Outputs 2061–2064 are coupled to inputs 6021–6024.

RX RAM 51' of FIG. 16 is analogues to RX RAM 51 of FIG. 6, but has four I/O's 5061–5063, wherein each I/O is analogues to I/O 506 if RX RAM 51. All four RX PACKERs 6111, 6222, 6333 and 6444 can read and write to and from RX RAM 51. RX FIFO 70' is analogues to RX FIFO 70 of FIG. 6, but preferably has more memory words than RX FIFO 70. RX FIFO 70' stores the receive requests of all four RX PACKERs 6111, 6222, 6333 and 6444.

Figure 17:
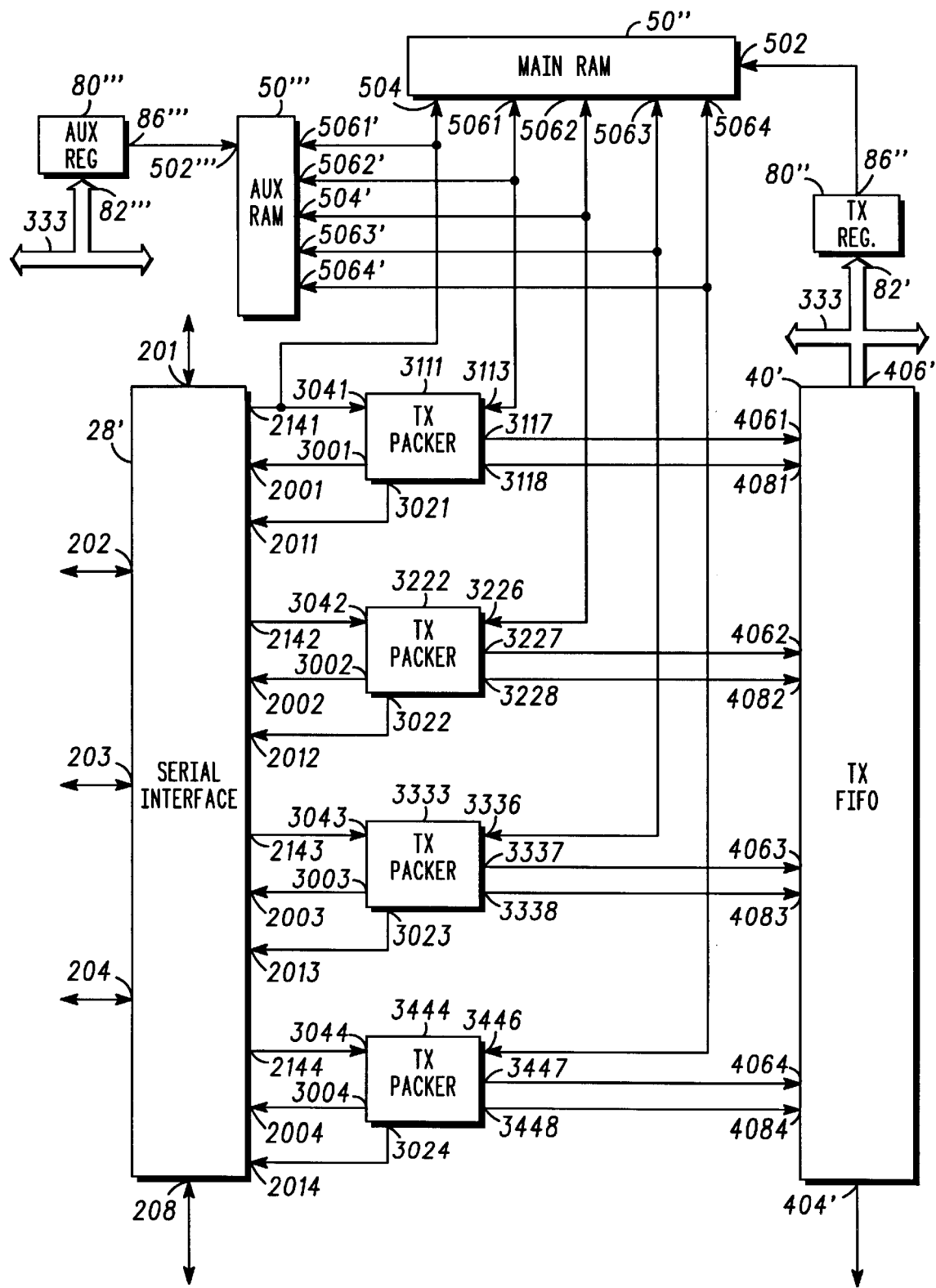
FIG. 17 is a schematic diagram of a transmit section of the multi channel controller, according to another preferred embodiment of the invention.

FIG. 17 is a schematic diagram of transmit section 1005" of MCC 100, according to another preferred embodiment of the invention. Transmit section 1005" is analogues to transmit section 1005 of FIG. 5 but it has four independent TX PACKERs 3111, 3222, 3333 and 3444. MAIN RAM 50" has I/O's 5061–5064 and inputs 502 and 504. AUX RAM 50'" is analogues to AUX RAM 50' of FIG. 5. AUX RAM 50'" has I/O's 5061'–5064' and inputs 502'" and 504'. AUX REG 80'" has input 82'41 and output 86'". TX FIFO 40' has inputs 4061–4064, and 4081–4084 AND OUTPUTS 406' AND 404'. TX FIFO 40' is analogues to TX FIFO 40 of FIG. 4, but preferably has more memory words than TX FIFO 40. TX FIFO 40' stores the receive requests of all four TX PACKERs 3111, 3222, 3333 and 3444. SI 28' has outputs 2141–2144, 2101–2104, 2061–2064 and 2041–2044 and I/O's 201–208. Each of the four TX PACKERs 3111, 3222, 3333 and 3444 is analogues to TX PACKER 30. I/O 3116, 3226, 3336 and 3446 of TX PACKERs 3111, 3222, 3333 and 3444 are analogues to I/O 306 of TX PACKER 30. Outputs 3001–3004 of TX PACKERs 3111, 3222, 3333 and 3444 are analogues to output 300 of TX PACKER 30. Inputs 3041–3044 of TX PACKERs 3111, 3222, 3333 and 3444 are analogues to input 304 of TX PACKER 30. Outputs 3118, 3228, 3338 and 3448 of TX PACKERs 3111, 3222, 6333 and 3444 are analogues to output 308 of TX PACKER 30. Inputs 3021–3024 of TX PACKERs 3111, 3222, 3333 and 3444 are analogues to input 302 of TX PACKER 30. Inputs 4081, 4082, 4083 and 4084 of TX FIFO 40' are analogues to input 400 of TX FIFO 40.

Outputs 2141–2144 of SI 28' are coupled to inputs 3041–3044 of TX PACKERs 3111, 3222, 3333 and 3444. Outputs 2101–2104 SI 28' are coupled to inputs 3021–3024 of TX PACKERs 3111, 3222, 3333 and 3444; Outputs 2061–2064 SI 28' are coupled to inputs 3021–3024 of TX PACKERs 3111, 3222, 3333 and 3444.

I/O's 3113, 3226, 3336 and 2446 of TX PACKERs 3111, 3222, 3333 and 3444 are coupled to I/O's 5601–5604 MAIN RAM 50" and 5061'–5064' AUX RAM 50'". Outputs 3117, 3227, 3337 and 3447 of TX PACKERs 3111, 3222, 3333 and 3444 are coupled to inputs 4061–4064 TX FIFO 40'. Outputs 3118, 3228, 3338 and 3448 of TX PACKERs 3111, 3222, 3333 and 3444 are coupled to inputs 4081–4084 TX FIFO 40'. Input 82" of TX REG 80" and input 82'" of AUX REG 80'" are coupled to bus 333. Output 86" of TX REG 80" is coupled to input 502 of MAIN RAM 50". Output 86'" of AUX REG 80'" is coupled to input 502' of AUX RAM 50'". Output 2141 of SI 28' is coupled to input 504 of MAIN RAM 50" and input 504'" of AUX RAM 50'". Output 406' of TX FIFO 40' is coupled to bus 333. Output 404' of TX FIFO 40' is coupled to input 154 of MRH 150.

All four TX PACKERs 3111, 3222, 3333 and 3444 can read and write to and from MAIN RAM 50" and AUX RAM 50'".

Figure 18:
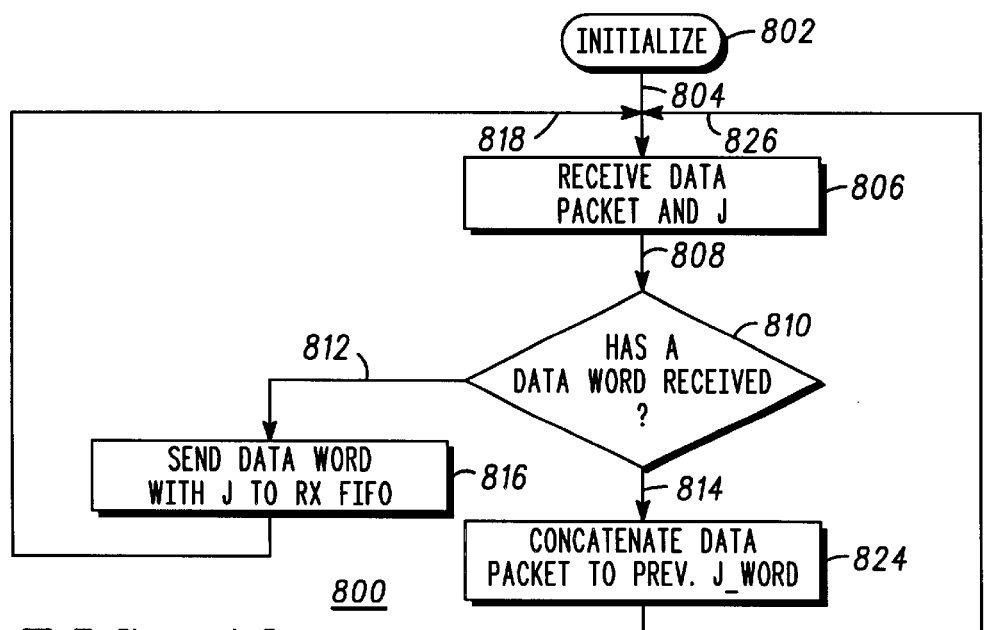
FIG. 18 is a simplified flow diagram of a method for receiving data packets, according to an embodiment of the invention.

FIG. 18 is a simplified flow diagram of method 800 to receive data packets, according to an embodiment of the invention. Method 800 comprising of the following steps:

In 'INITIALIZE' step 802, CPU 160 initializes RX RAM 51. CPU 160 writes to RX RAM 51 a set of initialization words, via RX REG 90.

As indicated by path 804, step 802 is followed by 'RECEIVE DATA PACKET AND J' step 806. In step 806, RX PACKER 60 receives, from SI 28, a data packet from the j'th communication channel and the corresponding j 333.

As indicated by path 808, step 806 is followed by query 'HAS A DATA WORD RECEIVED ?" step 810. In step 810, RX PACKER 60 checks if it contains a whole data word from the j'th communication channel.

As indicated by path 812, if the answer is "YES", query step 810 is followed 'SEND DATA WORD WITH ITS J TO RX FIFO" step 816. In step 816, the data word and j 333 are sent to RX FIFO 70, causing RX FIFO 70 to send a receive request to MRH 150. MRH 150 stores receive requests and causes CPU 160 to process the data word.

As indicated by path 814, if the answer is "NO" then query step 810 is followed by 'CONCATENATE RECEIVED DATA PACKET WITH PREVIOUS DATA' step 824. In step 824 the data packet from the j'th communication channel is concatenated to the content of j__radd.

As indicated by paths 818 and 826, steps 816 and 814 are followed by step 806.

Figure 19:
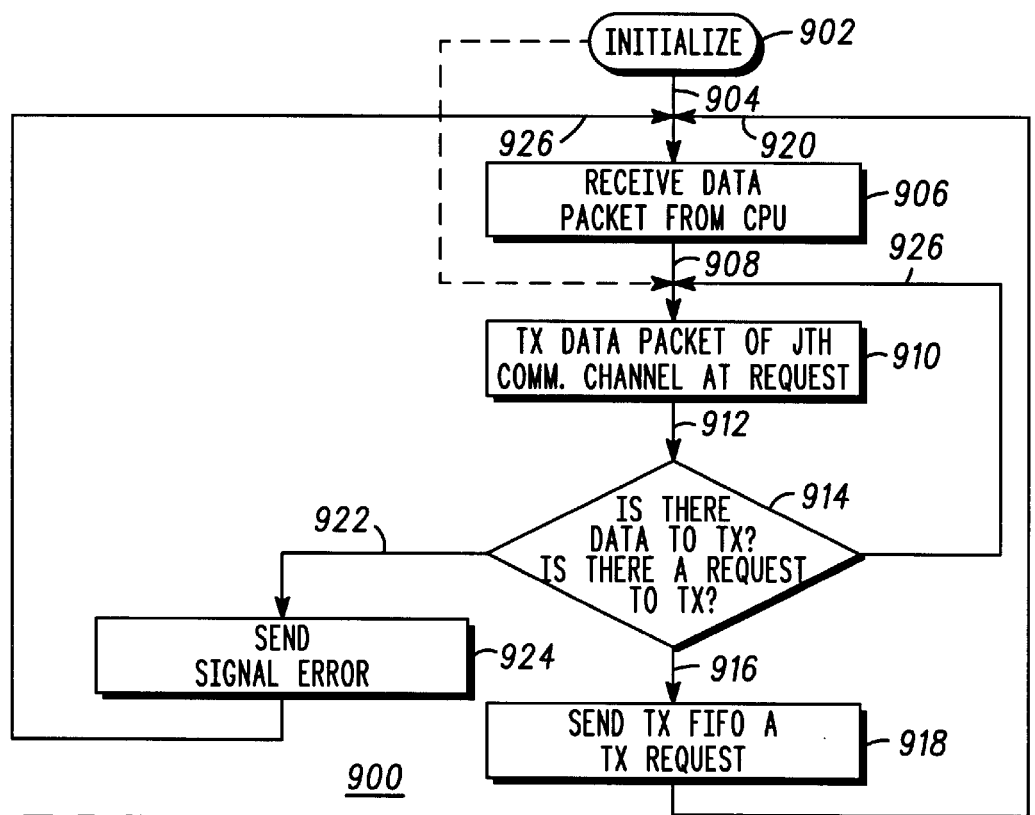
FIG. 19 is a simplified flow diagram of a method for transmitting data packets, according to an embodiment of the invention.

FIG. 19 is a simplified flow diagram of method 900 for transmitting data packets, according to an embodiment of the invention. Method 900 comprising of the following steps:

In 'NITIALIZE' step 902, CPU 160 initializes MAIN RAM 50. CPU 160 writes to MAIN RAM 50 a set of initialization words, via TX REG 80.

As indicated by path 904, step 902 is followed by 'RECEIVE DATA WORD FROM CPU' step 906. In step 906 CPU 160 writes at least one data word, to MAIN RAM 50. If CPU 160 initializes MAIN RAM 50 by writing data words, step 906 can be skipped, and as indicated by the dashed path 905, step 902 is followed by step 910.

As indicated by path 908, step 906 is followed by 'TRANSMIT DATA PACKET OF #CH AT REQUEST WHILE THERE IS DATA TO TRANSMIT' step 910. In step 910, TX PACKER 30 receives a request from SI 28 to transmit a data packet to the j'th communication channel. TX PACKER 30 sends a data packet to SI 28, which sends the data to the j'th communication channel. SI 28 also sends j 333 to MAIN RAM 50, so that MAIN RAM 50 will write j_word to TX PACKER 30.

As indicted by path 912, step 910 is followed by query 'IS TX PACKER EMPTY ?, IS THERE A REQUEST TO TX?' step 914. In step 914 TX PACKER 30 checks if it is empty and if there is a request to transmit data.

As indicated by path 922 if TX PACKER 30 is emptied before it transmits a whole data packet, step 914 if followed by step 'SEND SIGNAL ERROR' 924. In step 924 MCC 100 sends an error signal to CPU 160. As indicated by path 926, step 924 is followed by step 906.

TX PACKER 30 can be empty if a whole j_word was sent to the j'th communication channel. As indicated by paths 916 and 928 accordingly, if TX PACKER 30 empty then step 914 is followed by 'SEND TX FIFO A TX REQUEST' step 918.

As indicated by path 926, if TX PACKER 30 is not empty then step 914 is followed by step 910. In step 918 TX PACKER 30 sends to TX FIFO 40 j 333. TX FIFO 40 sends MRH 150 a transmit request. MRH 150 causes CPU 160 to read the content of TX FIFO 40 and to write a data word to j_add.

Figure 20:
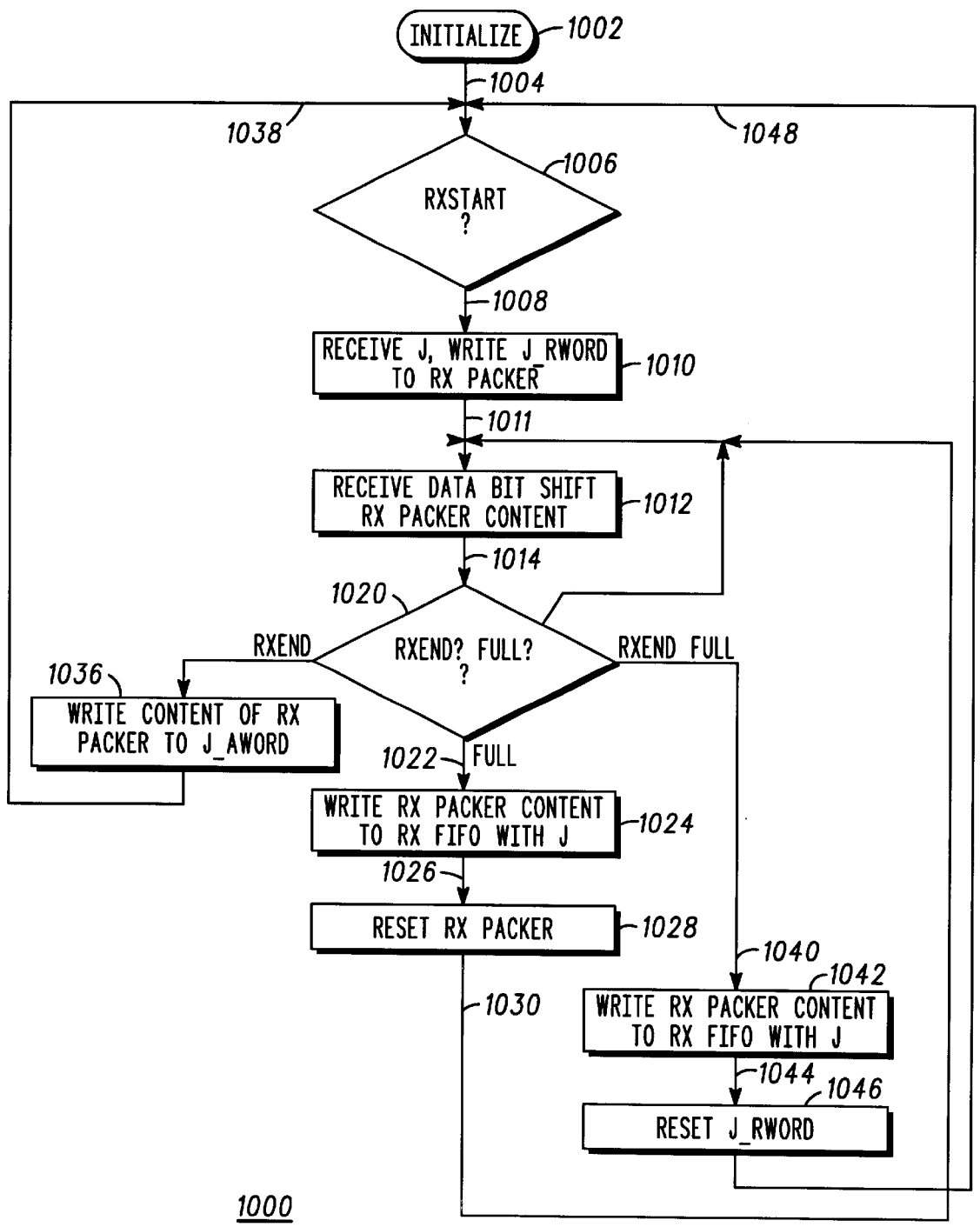
FIG. 20 is a flow diagram of a method for receiving data packets, according to an embodiment of the invention.

FIG. 20 is a flow diagram of method 1000 for receiving data packets, according to an embodiment of the invention; Method 1000 comprising of the following steps:

In 'INITIALIZE' step 1002, CPU 160 initializes RX RAM 51. CPU 160 writes to RX RAM 51 a set of initialization words, via RX REG 90.

As indicated by path 1004, step 1002 is followed by step 1006.

In query 'RXSTART ?' step 1006 RX PACKER 60 checks if it got an RXSTART signal 6043'. SI 28 simultaneously sends j 333 to MCC 100. Both signals indicates that SI 28 sends MCC 100 data from the j'th communication channel. As indicated by path 1008, if a RXSTART signal 6043' is received, j_rword is written to RX PACKER 60. As indicated by paths 1011 step 1010 is followed by 'RECEIVE DATA BIT SHIFT RX PACKER CONTENT' step 1012.

In step 1012 RX PACKER 60 receives a data bit from SI 28 shifts its content accordingly. RX PACKER 60 can receive more then a single bit, and its content is shifted accordingly.

As indicated by path 1014, step 1012 is followed by query 'RXEND ? FULL ?' step 1020. In query step 1020 RX PACKER 60 checks if a transmission of a data packet ended (i.e.—if it received a RXEND signal 6044') and if RX PACKER 60 is full.

As indicated by path 1034, if RX PACKER 60 received a RXEND signal 6044', and RX PACKER 60 is not full, query step 1020 is followed by 'WRITE CONTENT OF RX PACKER TO J_RADD' step 1036. In step 1036 RX PACKER 60 writes its content to j_radd. As indicated by path 1038, step 1036 is followed by step 1006.

As indicated by path 1032, if RX PACKER 60 did not receive a RXEND signal 6044', and RX PACKER 60 is not full, query step 1020 is followed by step 1012.

As indicated by path 1040, if RX PACKER 60 received a RXEND signal 6044', and RX PACKER 60 is full, query step 1020 is followed by 'WRITE RX PACKER CONTENT TO RX FIFO WITH J' step 1042. As indicated by path 1044, step 1042 is followed by 'RESET J_RADD' step 1046. In step 1042, RX PACKER 60 sends its content, and j 333 (received from SI 28) to RX FIFO 70. RX FIFO 70 sends a receive request, via output 706 to MRH 150. MRH 150 causes CPU 160 to read the content.

As indicated by path 1022, if RX PACKER 60 did not receive a TXEND signal 6044', and RX PACKER 60 is full, query step 1020 is followed by 'WRITE RX PACKER CONTENT TO RX FIFO WITH J'. As indicated by path 1026, step 1024 is followed by 'RESET RX PACKER' step 1028. Step 1024 is analogues to step 1042. In step 1028, the content of RX PACKER 60 is reset. As indicated by 1030 step 1012 is followed by step 1014.

Figure 21:
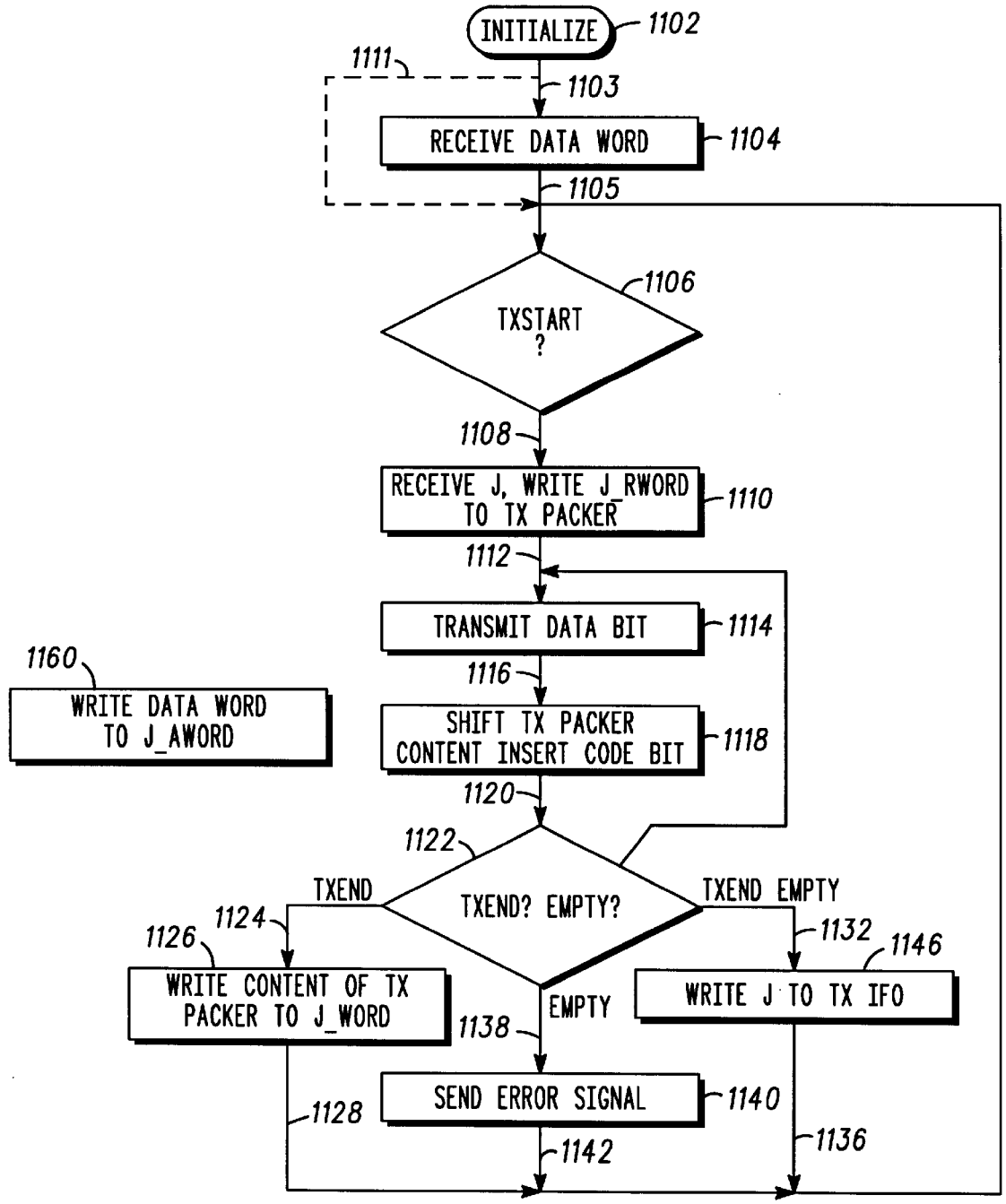
FIG. 21 is a flow diagram of a method for transmitting data packets, according to a embodiment of the invention.

FIG. 21 is a flow diagram of a method 1100 for transmitting data packets, according to an embodiment of the invention. Method 900 comprising of the following steps:

In 'INITIALIZE' step 1102, CPU 160 initializes MAIN RAM 50. CPU 160 writes to MAIN RAM 50 a set of initialization words, via TX REG 80.

As indicated by path 1103, step 1102 is followed by 'RECEIVE DATA WORD' step 1104. In step 1104 CPU 160 writes at least one data word, to MAIN RAM 50. If CPU 160 initializes MAIN RAM 50 by writing data words, step 1104 can be skipped, and as indicated by the dashed path 1111, step 1102 is followed by query 'TXSTART?' step 1106. As indicated by path 1105, step 1104 is followed by step 1106.

In step 1106 TX PACKER 30 checks if it received a 'TXSTART' signal 3043' from SI 28, indicating that data has to be transmitted from TX PACKER 30. As indicated by path 1108, step 1104 is followed by 'RECEIVE J WRITE J_WORD TO TX PACKER' step 1110. In Step 1110 SI 28 sends j 300 to MAIN RAM 50 and TX PACKER 30, which indicated that MCC 100 has to send data to the j'th communication channel, and j_word is sent from MAIN RAM 50 to TX PACKER 30.

As indicated by path 1112, path 1110 if followed by 'TRANSMIT DATA BIT' step 1114. In step 1114, TX PACKER 30 transmits a data bit to SI 28. TX PACKER 30 can transmit more than one bit to SI 28.

As indicted by path 1116, step 1114 is followed by 'SHIFT TX PACKER CONTENT INSERT CODE BIT' step 1118. In step 1118, the content of TX PACKER 30 is shifted, so that the previously transmitted data bit is omitted, and a code bit is inserted to the bit which is emptied as a result of the shift. For example, if TX PACKER 30 transmits its LSB and shifts its content to the right, a code bit is inserted to the MSB of TX PACKER 30. The code bits form a code word which allows a detector to detect that TX PACKER 30 is empty.

As indicted by path 1120, step 1118 is followed by query 'TXEND SIGNAL ? EMPTY SIGNAL ?' step 1122.

As indicated by path 1130, if TX PACKER 30 did not receive a TXEND signal 3044', and it is not empty, query step 1122 is followed by step 1114.

As indicated by path 1132, if TX PACKER 30 is empty and it received a TXEND signal 3044', step 1122 is followed by 'WRITE J TO RX FIFO' step 1134. In step 1134, MCC 100 writes J 333 to TX FIFO 40. TX PACKER 30 sends to TX FIFO 40 j 333. TX FIFO 40 sends MRH 150 a transmit request. MRH 150 causes CPU 160 to read the content of TX FIFO 40 and to write a data word to j_add. As indicated by path 1136, step 1134 is followed by step 1106.

As indicated by path 1124, if TX PACKER 30 did receive a TXEND signal 3044', and it is not empty, query step 1122 is followed by 'WRITE WORD OF TX PACKER TO J_WORD' step 1126, in which, the content of TX PACKER 30 is written to j_add. As indicated by path 1128, step 1126 is followed by step 1106.

Step 1160 can be executed in parallel to steps 1106–1146. In step 1160 CPU 160 writes a data word to j_add. Usually, CPU 160 writes a data word to be sent to communication channel, while MCC 100 transmits data to another communication channel.

Figure 22:
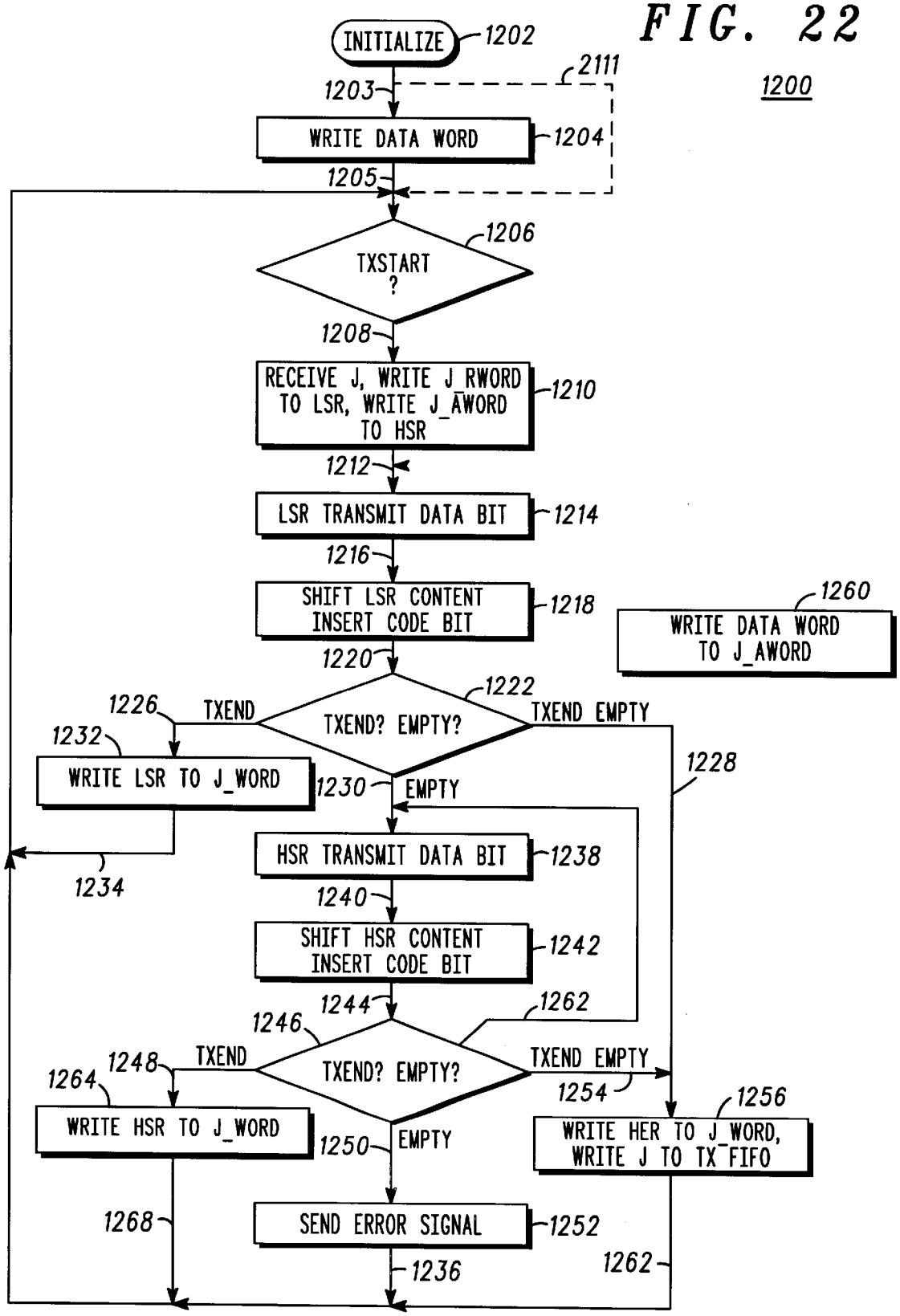
FIG. 22 is a flow diagram of a method for transmitting data packets, according to another embodiment of the invention.

FIG. 22 is a flow diagram of method 1200 for transmitting data packets, according to another embodiment of the invention. Method 1200 comprising of the following steps:

In 'INITIALIZE' step 1202, CPU 160 initializes MAIN RAM 50 and AUX RAM 50'. CPU 160 writes to MAIN RAM 50 and AUX RAM 50' a set of initialization words, via TX REG 80.

As indicated by path 1203, step 1202 is followed by 'WRITE DATA WORD' step 1204. In step 1204 CPU 160 writes at least one data word, to AUX RAM 50' or MAIN RAM 50. If CPU 160 initializes MAIN RAM 50 and AUX RAM 50' by writing data words, step 1204 can be skipped, and as indicated by the dashed path 1211, step 1202 is followed by query 'TXSTART ?' step 1206. Step 1204 can be executed in parallel to steps 1206–1260. CPU 160 can write data words to MCC 100' while MCC 100' transmits data to SI 28. Usually, CPU 160 sends data words to AUX RAM 50', and data words stored within AUX RAM 50' are sent to MAIN RAM 50.

Conveniently, CPU 160 writes a data word to MCC 100, which will be transmitted to a communication channel, while MCC 100 transmits data to other communication channels. Preferably, CPU 160 writes data word which will be sent to a communication channel, between two consecutive transmission to this channel.

As indicated by path 1205, step 1204 is followed by 'TXSTART ?' step 1206. In step 1206 TX PACKER 30' checks if it received a 'TXSTART' signal 3043' from SI 28, indicating that data has to be transmitted from TX PACKER 30. As indicated by path 1208, step 1204 is followed by 'RECEIVE J, WRITE J_WORD TO LSR, WRITE J_AWORD TO HSR' step 1210. In Step 1210 SI 28 sends j 333 to MAIN RAM 50, AUX RAM 50' and TX PACKER 30', which indicated that the j'th communication channel has to receive, resulting in writing j_word to LSR 64 and writing j_aword to HSR 62.

As indicated by path 1212, path 1210 if followed by 'LSR TRANSMIT DATA BIT' step 1214. In step 1214, LSR 64 transmits a data bit to the j'th communication channel, via SI 28. Conveniently, LSR 64 can transmit more than one bit to SI 28. As indicted by path 1216, step 1214 is followed by 'SHIFT LSR CONTENT INSERT CODE BIT' step 1218. In step 1218, the content of LSR 64 is shifted, so that the previously transmitted data bit is omitted, and a code bit is inserted to the bit which is emptied as a result of the shift. For example, if LSR 64 transmits its LSB and shifts its content to the right, a code bit is inserted to the MSB of LSR 64. The code bits form a code word which allows detector 65 to detect that LSR 64 is empty.

As indicted by path 1220, step 1218 is followed by query 'TXEND ? EMPTY ?' step 1222. In step 1222 TX PACKER 30' checks if LSR 64 is empty and whether a TXEND signal 3044' was received by TX PACKER 30.

As indicated by path 1224, if LSR 64 did not receive a TXEND signal 3044', and it is not empty, query step 1224 is followed by step 1214.

As indicated by path 1228, if LSR 64 is empty and it received a TXEND signal 3044', step 1222 is followed by 'WRITE HSR TO J_WORD, WRITE J TO TX FIFO' step 1256. In step 1256, The content of HSR is sent to j_add and j 333 is sent to TX FIFO 40. TX PACKER 30 sends to TX FIFO 40 j 333. TX FIFO 40 sends MRH 150 a transmit request. MRH 150 causes CPU 160 to read the content of TX FIFO 40 and to write a data word to j_aadd. As indicated by path 1258, step 1258 is followed by step 1202.

As indicated by path 1226, if LSR 64 received a TXEND signal 3044' and it is not empty, query step 1222 is followed by 'WRITE LSR TO J_ADD' step 1232.

As indicated by path 1230, if LSR 64 is empty and it did not receive TXEND signal 3044', query step 1222 is followed by 'HSR TRANSMIT DATA BIT' step 1238. In step 1238, HSR 62 transmits a data bit to SI 28. Conveniently, HSR 62 can transmit more than one bit to SI 28. As indicated by path 1240, step 1238 is followed by 'SHIFT HSR CONTENT INSERT CODE BIT' step 1242. In step 1242, the content of HSR 62 is shifted, so that the previously transmitted data bit is omitted, and a code bit is inserted to the bit which is emptied as a result of the shift. The code bits form a code word which allows second detector 67 to detect that HSR 62 is empty.

As indicated by 1244, step 1242 is followed by query 'TXEND ? EMPTY?' step 1246. In step 1246 TX PACKER 30' checks if HSR 62 is empty and whether a TXEND signal 3044' was received by TX PACKER 30.

As indicated by path 1256, if HSR 62 did not receive a TXEND signal 3044', and it is not empty, query step 1256 is followed by step 1238.

As indicated by path 1254, if HSR 62 is empty and it received a TXEND signal 3044', query step 1246 is followed by step 1256.

As indicated by path 1248, if HSR 64 received a TXEND signal 3044' and it is not empty, query step 1246 is followed by 'WRITE HSR TO J_ADD' step 1264. In step 1264 the content of HSR 62 is sent to j_add. As indicated by path 1268, step 1264 is followed by step 1206.

As indicated by path 1250, if LSR 64 is empty and it did not receive TXEND signal 3044', query step 1246 is followed by 'SEND ERROR SIGNAL' step 1252. In step 1252 MCC 100' sends a error signal which indicated that it had nothing to transmit, although it was requested to transmit. The error signal can be sent to CPU 160. As indicated by path 1236, step 1252 is followed by step 1206.

It will be understood by those skilled in the art that various changes in form and detail can be made without departing from the spirit and scope of the invention which is determined by the claims that follow.

What is claimed is:

1. A communication controller for handling and processing data packets received from multiple communication channels, the communication controller comprising;

a processor for processing data;
a serial interface, coupled to the communication channels;
a multi channel controller coupled to the serial interface and the processor, for interfacing between the communication channels and the processor;
wherein the communication channels and the serial interface send and receive data packets;
wherein the processor sends, receives and processes data words;
wherein the multi channel controller receives data packets from the serial interface, concatenates data packets and sends data words to the processor;
wherein the multi channel controller receives data words from the processor, and transmits data packets to the serial interface; and
a transmission portion having:
  a memory bank, for storing data words;
  a transmit stack for sending transmit requests;
  a transmit register for interfacing between the processor to the memory bank, and
  a transmit packer, coupled to the serial interface, to the transmit stack and to the memory bank for transmitting data to the serial interface;
wherein a data packet does not have more bits than a data word.

2. The communication controller of claim 1 wherein the serial interface determines which communication channel will transmit or receive data packets.

3. The communication controller of claim 1 wherein the communication controller is able to receive a data packet from a first communication channel and transmit a data packet to another communication channel, simultaneously.

4. The communication controller of claim 1 wherein M communication channels are coupled to the serial interface;
wherein when the serial interface determines that data has to be transmitted to one of the communication channel (the j'th communication channel, j being an index having values from 1 to M), the serial interface sends control signals to the transmit packer and to the memory bank;
wherein the memory, bank as M memory words;
wherein a data word (j_word) which is to be transmitted to the j'th communication channel is stored in a memory word (j_add);
wherein the serial interface causes the memory bank to send j_word to the transmit packer;
wherein the transmit packer receives the j_word and transmits a data packet to the j'th communication channel;
wherein if the transmit packer is empty after transmitting a data packet, the transmit packer sends j to the transmit stack;
wherein if the transmit packer is not empty after transmitting a data packet, the transmit packer writes its content to j_add; and
wherein after the transmit stack receives j it sends a transmit request to the processor; and
wherein the transmit request causes the processor to read the content of the transmit stack and to write a data word to j_add.

5. A communication controller for handling and processing data packets received from multiple communication channels, the communication controller comprising:
a processor for processing data;
a serial interface, coupled to the communication channels;
a multi channel controller coupled to the serial interface and the processor, for interfacing between the communication channels and the processor;
wherein the communication channels and the serial interface send and receive data packets;
wherein the processor sends, receives and processes data words;
wherein the multi channel controller receives data packets from the serial interface, concatenates data packets and sends data words to the processor;
wherein the multi channel controller receives data words from the processor, and transmits data packets to the serial interface; and
a transmission portion having:
  a memory bank, for storing data words;
  an auxiliary memory bank, for storing data words;
  a transmit stack, for sending transmit requests;
  a transmit register, coupled to the memory bank and the processor for interfacing between the processor and the memory bank;
  an auxiliary transmit register, coupled to the auxiliary memory bank and the processor, for interfacing between the processor and the auxiliary memory bank; and
  a transmit packer, coupled to the serial interface, to the transmit stack, to the memory bank and to the auxiliary memory bank, for transmitting data from the memory bank and the auxiliary memory bank to the serial interface;
wherein a data packet does nut have more bits than a data word.

6. The communication controller of claim 5 wherein the memory bank and the auxiliary memory bank each have M memory words;
wherein a data word (j_word) which is to be transmitted to the j'th communication channel is stored in a memory word j_add) of the memory bank; and
wherein a data word (j_aword) which is to be transmitted to the j'th communication channel is stored in a memory word (j_aadd) of the auxiliary memory bank.

7. The communication controller of claim 6 wherein M communication channels are coupled to the serial interface;
wherein when the serial interface determines that data has to be transmitted to the j'th communication channel, it sends control signals to the transmit packer, to the memory bank and to the auxiliary memory bank;
wherein the control signals cause the memory bank to send the transmit packer the j_word;
wherein the transmit packer receives the j_word and transmits a data packet to the j'th communication channel;
wherein if the transmission of a data packet has not ended and the transmit packer finished to transmit the j_word, the transmit packer reads j_aword and transmits data bits to the j'th communication channel;
wherein if the transmit packer is not empty after transmitting a data packet, the transmit packer writes its content to j_add;
wherein after the j_word is transmitted, the transmit packer sends j to the transmit stack;
wherein after the transmit stack receives j it sends a transmit request to the processor, and
wherein the transmit request causes the processor to read the content of the transmit stack and to write a data word to j_aadd.

8. The communication controller of claim 6 wherein the transmit packer comprises of:
- a first shift register, for storing j_word and transmitting data bits of j_word;
- a second shift register, for storing j_aword and transmitting data bits of j_aword;
- a first multiplexer, coupled to the first shift register and to the second shift register, for coupling the first shift register or the second shift register to the memory bank;
- a second multiplexer, coupled to the first shift register and to the second shift register, for coupling the first shift register or the second shift register to the serial interface;
- a detector, coupled to the first shift register, for detecting when the first shift register is empty;
- a first encoder, coupled to the first shift register, for sending code bits to the first shift register;
- wherein the code bits which arc sent to the first shift register form a code word which enables the detector to detect when the first shift register is empty; and
- wherein when the detector detects that the first shift register is empty it sends a signal which causes the first multiplexer and the second multiplexer to select the second shift register.

9. The communication controller of claim 8 wherein when the serial interface determines that data has to be transmitted to the j'th communication channel, it sends control signals to the transmit packer, to the memory bank and to the auxiliary memory bank;
- wherein the control signals cause the memory bank to send the j_word to the first shift register;
- wherein the control signals cause the auxiliary memory bank to send the j_aword to the second shift register;
- wherein the first shift register receives the j_word and transmits data bits to the j'th communication channel;
- wherein if the transmission of a data packet has not ended and first shift register is empty, the second shift register ends data bits to the j'th communication channel;
- wherein if the transmission of a data packet has ended and the first shift register is not empty, the content of the first shift register is sent, via the first multiplexer to j_add;
- wherein if the transmission or a data packet has ended, the first shift register is empty, the content of the second shift register is sent, via the first multiplexer to j_add;
- wherein when the first shift register is empty, the transmit packer sends j to the transmit stack;
- wherein after the transmit stack receives j it sends a transmit request to the processor; and
- wherein the transmit request causes the processor to read the content of the transmit stack and to write a data word to j_aadd.

10. The communication controller of claim 8 wherein the transmit packer further comprises of a second detector, coupled to the second shift register, for detecting when the second shift register is empty; and
- a second encoder, coupled to the second shift register, for sending code bits to the second shift register.

11. The communication controller of claim 10 wherein when the serial interface determines that data has to be transmitted to the j'th communication channel, it sends control signals to the transmit packer, to the memory bank and to the auxiliary memory bank;
- wherein the control signals cause the memory bank to send the first shift register the j_word;
- wherein the control signals cause the auxiliary memory bank to send the second shift register the j_aword;
- wherein the first shift register receives the j_word and transmits data bits to the j'th communication channel;
- wherein if the transmission of a data packet has not ended and the first shift register is empty, the second shift register sends data bits to the j'th communication channel;
- wherein if the transmission of a data packet has ended and the first shift register is not empty, the content of the first shift register is sent, via the first multiplexer to j_add;
- wherein if the transmission of a data packet has ended, the first shift register is empty, the content of the second shift register is sent, via the first multiplexer to j_add;
- wherein if the transmission of a data packet has not ended and the first shift register and the second shift register are empty, the second detector sends an error signal;
- wherein when the first shift register is empty, the transmit packer sends j to the transmit stack;
- wherein after the transmit stack receives j it sends a transmit request to the processor; and
- wherein the transmit request causes the processor to read the content of the transmit stack and to write a data word to j_aadd.

12. A communication controller for handling and processing data packets received from multiple communication channels, the communication controller comprising:
- a processor for processing data;
- a serial interface, coupled to the communication channels;
- a multi channel controller coupled to the serial interface and the processor, for interfacing between the communication channels and the processor;
- wherein the communication channels and the serial interface send and receive data packets;
- wherein the processor sends, receives and processes data words;
- wherein the multi channel controller receives data packets from the sea interface concatenates data packets and sends data words to the processor;
- wherein the multi channel controller receives data words from the processor, and transmits data packets to the serial interface; and
- a receiving having:
  - a receive memory bank for storing data words;
  - a receive stack for sending receive requests;
  - a receive register for interfacing between the processor and the receive memory bank; and
  - a receive packer, coupled to the serial interface for receiving data from the serial interface;
- wherein a data packet does not have more bits than a data word.

13. The communication channel of claim 12 wherein M communication channels are coupled to the serial interface;
- wherein when the serial interface determines that data has to be received from the j'th communication channel, it sends control signals to the receive packer and to the receive memory bank;
- wherein the j'th memory word (j_radd) of the receive memory bank, contains data (j_rword) which is sent from the j'th communication channel;
- wherein the control signals cause the receive memory bank to send the j_rword to the receive packer;
- wherein the receive packer reads the j_rword and receives a data packet from the j'th communication channel;

wherein if the receive packer is not full after receiving the data packet, the receive packer writes its content to j_radd;

wherein if the receive packer is full after receiving the data packet, the receive packer sends the content of the receive packer and j to the receive stack, and the receive stack sends a receive request to the processor; and wherein the receive request causes the processor to read the content of the receive stack and to write a data word to j_radd.

14. The communication controller of claim 13 wherein the receive packer comprises:

a receive shift register, for storing j_rword and receiving data bits from the j'th communication channel;

a first receive multiplexer, coupled to the receive memory bank and to the receive shift register, for selecting whether to to write j_rword or a constant k to the receive shift register;

a second receive multiplexer, coupled to the receive shift register and to the receive memory bank, for selecting whether to write the content of the receive shift register or the constant k to j_radd;

a detector, coupled to the receive shift register, for detecting when the receive shift register is empty;

wherein when the detector detects that the receive shift register is full it sends a 'FULL' signal to the first receive multiplexer and to the second receive multiplexer;

wherein if the receive packer receives a data packet and the receive shift register is not full, the content of the receive shift register is written to j_radd;

wherein if a 'FULL' signal is sent by the detector before the receive packer receives a data packet, the content of the receive shift register is written to the receive stack and the first receive multiplexer writes the constant k to the receive shift register, wherein if a 'FULL' signal is sent by the detector when the reception of a data packet ends, the content of the receive shift register is written to the receive stack and the second receive multiplexer writes the constant k to j_radd; and wherein the constant k is an initialization word.

15. A communication controller for handling and processing data packets received from multiple communication channels, the communication controller comprising:

a processor for processing data;

a request handler;

a serial interface, coupled to the multiple communication channels;

a multi channel controller coupled to the serial interface and the processor, for interfacing between the communication channels and the processor;

a request handler, for interfacing between the multi channel controller and the processor;

wherein the communication channels and the serial interface send and receive data packets;

wherein the processor sends, receives and processes data words;

wherein the multi channel controller has a receive stack and a transmit stack;

wherein a data packet does not have more bits than a data word;

wherein the multi channel controller receives data packets from the serial interface, and writes to the receive stack a receive request when the multi channel controller received a data word from one of the communication channels; and wherein the multi channel controller transmits data to the serial interface, and writes to the transmit stack a transmit request, when the multi channel controller finished to transmit a data word to a communication channel.

16. The communication controller of claim 15 wherein the receive request contains the received data word and j which describes which communication channel sent the data word; and wherein the transmit request contains j which describes the communication channel which received the data word.

17. The communication controller of claim 16 wherein the multi channel controller has a transmission portion comprising:

a memory bank for storing data words;

a transmit stack for sending transmit requests;

a transmit register for interfacing between the processor to the memory bank; and a transmit packer, coupled to the serial interface, to the transmit stack and to the memory bank for transmitting data to the serial interface.

18. The communication controller of claim 16 wherein the multi channel controller has a receiving portion comprising:

a receive memory bank for storing data words;

a receive stack for sending receive requests;

a receive register for interfacing between the processor and the receive memory bank; and a receive packer, coupled to the serial interface for receiving data from the serial interface.

19. The communication controller of claim 16 wherein the receive stack has A memory words of B bits each, A and B being integers;

wherein each memory word is comprised of B1 bits of data and B2 bits of j;

wherein the transmit stack has C memory words of B2 bits each; each word can store j; and wherein A<C and B2>0.

20. The communication controller of claim 19, wherein the processor handles the transmit requests after handling the receive request.

21. The communication controller of claim 19 wherein the processor checks the status of the receive stack more frequently than it checks the status of the transmit stack.

22. The communication controller of claim 19 wherein the processor gives the receive request a higher priority than the transmit request.

23. A method for receiving data packets from multiple communication channels, storing the data packets in a receive memory bank and sending data words to a receiver, the method comprising of the following steps:

writing to the receive memory-bank initialization words, from the processor, wherein the initialization words indicate that the communication channels are silent;

receiving data packets from-m tie j'th communication channel;

if a data word was received from the j'th communication channel sending the data word from the memory bank to the receiver, otherwise concatenating the data packet to the data which was previously received from the j'th communication channel, and which was not sent to the receiver; and jumping to the step of receiving data packets from the j'th communication channel.

24. The method of claim 23 wherein during the step of writing to the receive memory bank initialization words, writing a set of initialization words (IW(1)-IW(M)); wherein each initialization word wherein the each FULL flag is placed in more then one location within the initialization word; wherein if the FULL flag is not stored at the beginning of an initialization word, the beginning of the initialization word is EMPTY bits.

25. A method for receiving data packets from multiple communication channels, storing the data packets in a memory bank and sending data words to a processor, the method comprising of the following steps:

writing to the memory bank initialization words, from the processor, wherein the initialization words indicate that the communication channels are silent;

receiving data packets from the j'th communication channel;

if a data word was received from the j'th communication channel sending the data word from the memory bank to the processor, otherwise concatenating the data packet to the data which was previously received from the j'th communication channel, and which was not sent to the processor; and jumping to the step of receiving data packets from the j'th communication channel.

26. A method for operating a communication controller, coupled to multiple (M) communication channels having a receive memory bank for storing data words;

a receive stack for sending receive requests;

a receive register for interfacing between the processor to the receive memory bank;

and a receive packer, coupled to the serial interface, to the receive stack and the receive memory bank, for receiving data from the serial interface;

wherein the j'th memory word (j_radd) of the receive memory bank, contains data (j_word) which is sent from the j'th communication channel, j being an index having values from 1 to M; wherein the serial interface sends a 'RXSTART' signal, for initiating a reception of a data packet, and the serial interface sends a 'RXEND' signal for ending the reception of the data packet;

the method comprising the following steps:

writing to the memory bank initialization words, from the processor, which indicate that no new data was received from the communication channels;

checking if an 'RXSTART' signal was received; wherein if the answer is 'YES', receiving j, which indicates that the j'th communication channel sends a data packet and writing j_word to the receive packer, receiving data bits from the j'th communication channel and shifting the content of the receive packer accordingly;

checking if the receive packer is full and if a 'TXEND' signal was received;

jumping to the step of receiving data bits if the receive packer is not full and a 'TXEND' signal was not received, writing the content of the receive packer to j_radd if the receive packer is not full and a 'TXEND' signal was received;

writing the content of receive packer to the receive stack and resetting the receive packer and jumping to the step of receiving data bits, if the receive packer is full and a 'TXEND' signal was not received; and wherein if the receive packer is full and a 'TXEND' signal was received then writing the content of receive packer to the receive stack; and resetting j_rword and jumping to the step of checking if an 'RXSTART' signal was received.

27. A method for transmitting data packets to multiple communication channels, and reading data words from a processor, and from a memory bank, wherein the j'th memory word (j_add) of the memory bank, contains data (j_word) which is to be sent to the j'th communication channel, j being an index having values from 1 to M; the method comprising of the following steps:

writing to the memory bank initialization words, from the processor;

writing data words from the processor to the memory bank;

transmitting a data packet to the j'th communication channel, when the j'th communication channel is ready to receive the data packet;

checking if a j_word was transmitted; wherein if the answer is 'YES' sending a transmit request to the processor; wherein the processor writes a data word to j_add as a result of the transmit request; and else, jumping to the step of transmitting a data packet to the j'th communication channel, when the j'th communication channel is ready to receive the data packet.

28. A method (1100) for operating a communication controller coupled to a processor and to multiple communication channels; wherein the communication controller has a memory bank, for storing data words; a transmit stack for sending transmit requests;

a serial interface, for coupling the communication controller to the multiple communication channels;

a transmit register for interfacing between the processor to the memory bank; and a transmit packer, coupled to the serial interface, to the transmit stack and to the memory bank for transmitting data to the serial interface;

wherein the j'th memory word (j_add) of the memory bank, contains data (j_word) to be sent to the j'th communication channel; wherein the serial interface sends a 'TXSTART' signal, for initiating a transmission of a data packet, and the serial interface sends a 'TXEND' signal for ending the transmission of the data packet, the method comprising the following steps:

writing to the memory bank initialization words, from the processor;

writing data words to the memory bank;

checking if a 'TXSTART' signal was received wherein if the answer is 'YES' receiving j and writing j_rword to the transmit packer; else staying in the step of checking if a 'TXSTART' signal was received;

transmitting a data bit to the j'th communication channel;

shifting the content of the transmit packer and inserting a code bit;

checking if the transmit packer is empty and if a 'TXEND' signal arrived;

jumping to the step of transmitting a data bit to the j'th communication channel, if the transmit packer is not empty and if a 'TXEND' signal was not received;

wherein if the transmit packer is empty and if a 'TEND' signal was received, writing j to the transmit stack and jumping to the step of checking (1106) if a 'TXSTART' signal has arrived;

wherein if the transmit packer is empty and if a 'TXEND' signal was not received sending an error signat and jumping to the step of checking if a 'TXSTART' signal has arrived; and wherein if the transmit packer is not empty and if a 'TREND' signal was received, writing the content of the transmit packer to j__add and jumping to step of checking if a 'TXSTART' signal has arrived.

* * * * *

UNITED STATES PATENT AND TRADEMARK OFFICE
CERTIFICATE OF CORRECTION

| | | |
|---|---|---|
| PATENT NO. | : 6,771,630 B1 | |
| APPLICATION NO. | : 09/498075 | |
| DATED | : February 4, 2000 | |
| INVENTOR(S) | : Eliezer Weitz et al. | |

It is certified that error appears in the above-identified patent and that said Letters Patent is hereby corrected as shown below:

In Column 22, Line 46, Claim No, 12:

Change "receiving having" to --receiving portion having--.

In Column 25, Line 9, Claim No, 24:

Insert --IW(j) has a R-bit FULL flag; and-- at end of line, after "word".

In Column 25, Line 10, Claim No, 24:

Change "then" to --than --.

In Column 25, Line 43, Claim No. 26:

Change "(j_word)" to --(j_rword)--.

In Column 25, Line 57, Claim No. 26:

Change "packer, receiving" to

--packer:

receiving--.

In Column 28, Lines 2-3, Claim No, 28:

Change "signat" to --signal --.

UNITED STATES PATENT AND TRADEMARK OFFICE
CERTIFICATE OF CORRECTION

| | |
|---|---|
| PATENT NO. | : 6,771,630 B1 |
| APPLICATION NO. | : 09/498075 |
| DATED | : February 4, 2000 |
| INVENTOR(S) | : Eliezer Weitz et al. |

It is certified that error appears in the above-identified patent and that said Letters Patent is hereby corrected as shown below:

In Column 28, Line 6, Claim No. 28:

Change "'TREND'" to --'XTEND'--.

Signed and Sealed this

Twenty-first Day of August, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,771,630 B1 |
| APPLICATION NO. | : 09/498075 |
| DATED | : August 3, 2004 |
| INVENTOR(S) | : Eliezer Weitz et al. |

It is certified that error appears in the above-identified patent and that said Letters Patent is hereby corrected as shown below:

In Column 22, Line 46, Claim No, 12:

Change "receiving having" to --receiving portion having--.

In Column 25, Line 9, Claim No, 24:

Insert --IW(j) has a R-bit FULL flag; and-- at end of line, after "word".

In Column 25, Line 10, Claim No, 24:

Change "then" to --than --.

In Column 25, Line 43, Claim No. 26:

Change "(j_word)" to --(j_rword)--.

In Column 25, Line 57, Claim No. 26:

Change "packer, receiving" to

--packer:

receiving--.

In Column 28, Lines 2-3, Claim No, 28:

Change "signat" to --signal --.

UNITED STATES PATENT AND TRADEMARK OFFICE
CERTIFICATE OF CORRECTION

PATENT NO. : 6,771,630 B1
APPLICATION NO. : 09/498075
DATED : August 3, 2004
INVENTOR(S) : Eliezer Weitz et al.

It is certified that error appears in the above-identified patent and that said Letters Patent is hereby corrected as shown below:

In Column 28, Line 6, Claim No. 28:

Change "'TREND'" to --'XTEND'--.

This certificate supersedes Certificate of Correction issued August 21, 2007.

Signed and Sealed this

Second Day of October, 2007

JON W. DUDAS
*Director of the United States Patent and Trademark Office*